US010367922B2

(12) United States Patent
Zhu et al.

(10) Patent No.: US 10,367,922 B2
(45) Date of Patent: Jul. 30, 2019

(54) METHOD AND APPARATUS FOR SENDING TRANSMISSION CONTROL PROTOCOL TCP DATA PACKET AND SYSTEM

(71) Applicant: Huawei Technologies Co., Ltd., Shenzhen (CN)

(72) Inventors: Xia Zhu, Nanjing (CN); Feng Li, Nanjing (CN); Jian Cheng, Nanjing (CN); Weiqing Kong, Nanjing (CN); Gang Chen, Beijing (CN); Yuedong Guo, Beijing (CN); Guangtao Ren, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 15/694,581

(22) Filed: Sep. 1, 2017

(65) Prior Publication Data
US 2017/0366650 A1 Dec. 21, 2017

Related U.S. Application Data

(63) Continuation of application No. PCT/CN2015/099278, filed on Dec. 28, 2015.

(30) Foreign Application Priority Data

Mar. 2, 2015 (CN) .......................... 2015 1 0093011

(51) Int. Cl.
*H04L 29/06* (2006.01)
*H04L 12/26* (2006.01)
(Continued)

(52) U.S. Cl.
CPC .......... *H04L 69/16* (2013.01); *H04L 43/0864* (2013.01); *H04L 47/27* (2013.01); *H04L 47/283* (2013.01); *H04L 69/22* (2013.01)

(58) Field of Classification Search
CPC ... H04L 47/27; H04L 43/0864; H04L 47/283; H04L 69/16; H04L 43/0829; H04L 43/16;
(Continued)

(56) References Cited

U.S. PATENT DOCUMENTS

2008/0186863 A1  8/2008  Baratakke et al.
2009/0073975 A1  3/2009  Shimonishi
(Continued)

FOREIGN PATENT DOCUMENTS

CN    1836418 A      9/2006
CN  102739515 A     10/2012
(Continued)

OTHER PUBLICATIONS

Cardona et al., "A Uniform Resource Name (URN) Namespace for Cablelabs", Internet Engineering Task Force, Request for Comments: 6289, pp. 1-7, IETF, (Jun. 2011).
(Continued)

*Primary Examiner* — Awet Haile
(74) *Attorney, Agent, or Firm* — Leydig, Voit & Mayer, Ltd.

(57) ABSTRACT

A method and an apparatus for sending a TCP data packet and a system. The method includes: obtaining a first round-trip time of sending a TCP data packet in a network, and determining a second round-trip time; if the first round-trip time is longer than the second round-trip time, using a congestion window determined according to a first algorithm as a first congestion window; otherwise, using a congestion window determined according to a second algorithm as the first congestion window; and sending the TCP data packet by using the first congestion window. In the technical solution disclosed in the present invention, a current congestion window that exists when a first round-trip time is obtained grows to a first congestion window at one
(Continued)

go, so that a requirement of a service for a throughput can be better met, and a network bandwidth can be utilized more effectively.

20 Claims, 5 Drawing Sheets

(51) Int. Cl.
*H04L 12/807* (2013.01)
*H04L 12/841* (2013.01)

(58) Field of Classification Search
CPC ......... H04L 47/12; H04L 47/30; H04L 69/22; H04L 69/187; H04L 47/127; H04L 47/11; H04L 47/193; H04L 47/25; H04L 69/161; H04L 69/163; H04L 47/225; H04L 47/10; H04W 28/0273
See application file for complete search history.

(56) References Cited

U.S. PATENT DOCUMENTS

| | | | | |
|---|---|---|---|---|
| 2011/0122771 A1* | 5/2011 | Joshi | .................... | H04J 3/0682 370/236 |
| 2011/0149730 A1* | 6/2011 | Nemeth | ............. | H04L 43/0864 370/234 |
| 2012/0213069 A1 | 8/2012 | Oguchi | | |
| 2013/0223254 A1* | 8/2013 | Oguchi | ................. | H04L 47/283 370/252 |
| 2013/0343187 A1 | 12/2013 | Wang et al. | | |
| 2014/0092741 A1* | 4/2014 | Williams | ................ | H04L 47/11 370/235 |
| 2015/0043339 A1* | 2/2015 | Wang | .................. | H04L 43/0864 370/230 |
| 2015/0049611 A1* | 2/2015 | Morandin | ............... | H04L 1/187 370/235 |

FOREIGN PATENT DOCUMENTS

| | | |
|---|---|---|
| CN | 104158760 A | 11/2014 |
| JP | 2015033125 A | 2/2015 |

OTHER PUBLICATIONS

Mathis et al., "The Macroscopic Behavior of the TCP Congestion Avoidance Algorithm," AMC SIGCOMM Computer Communication Review, vol. 27, No. 3, pp. 1-16, New York, New York (Jul. 1997).

"Transmission Control Protocol, DARPA Internet Program, Protocol Specification, RFC: 793," Information Sciences Institute, Marina del Rey, California (Sep. 1981).

\* cited by examiner

METHOD AND APPARATUS FOR SENDING TRANSMISSION CONTROL PROTOCOL TCP DATA PACKET AND SYSTEM

CROSS REFERENCE TO RELATED APPLICATIONS

This application is a continuation of International Application No. PCT/CN2015/099278, filed on Dec. 28, 2015, which claims priority to Chinese Patent Application No. 201510093011.3, filed on Mar. 2, 2015. The disclosures of the aforementioned applications are hereby incorporated by reference in their entireties.

TECHNICAL FIELD

Embodiments of the present invention relate to the field of network technologies, and in particular, to a method and an apparatus for sending a Transmission Control Protocol (TCP) data packet and a system.

BACKGROUND

Network congestion means that an excessively large quantity of packets are transferred in a network but there are limited resources for storing a forwarding node in the network, causing deterioration in network transmission performance. When network congestion occurs, a phenomenon such as a data loss, an increased delay, or a reduced throughput usually occurs. When network congestion is severe, congestion collapse is caused. As a traffic volume of high-throughput-rate applications (for example, online audio and video playback applications) increases rapidly, a data volume that needs to be transmitted by using a network also grows sharply; therefore, the network is required to maintain a high throughput. If a congestion control measure used to coordinate network resources is inappropriate, even if a network bandwidth is sufficient, high-throughput-rate applications cannot be utilized effectively.

The Transmission Control Protocol (TCP) is a reliable connection-oriented and byte-stream-based transport layer communications protocol, and is defined in RFC 793 of the IETF. Ever since the TCP appeared, many researchers have proposed a series of TCP congestion control mechanisms with the purpose of setting self-adjustment and recovery mechanisms to ensure that load cannot exceed a maximum capability of a network. TCP congestion control includes congestion avoidance and congestion recovery. The congestion avoidance is a prevention mechanism for preventing a network from entering a congested state as much as possible and enabling the network to keep working in a high-throughput and low-delay state. The congestion recovery is a recovery mechanism for recovering a network from a congested state and enabling the network to re-enter a high-throughput and low-delay state even if congestion already occurs.

So far, in a mature implementation manner of the TCP congestion control, a size of a congestion window (CWND) is adjusted to control a throughput of TCP packets. A size of a congestion window refers to a maximum quantity of TCP data packets that can be sent within one round-trip time (RTT). A larger size of a congestion window indicates a higher data sending rate and a higher throughput, but a higher possibility that network congestion occurs. In contrast, a smaller size of a congestion window indicates a lower data sending rate, a lower throughput, and a lower possibility that network congestion occurs. For example, when a congestion window is a 1 maximum segment size (MSS), each time one packet is sent, a receiver needs to send an acknowledgment, and then a second packet can be sent. This definitely prevents network congestion, but a throughput is extremely low. The TCP congestion control is to obtain an optimal congestion window value through adjustment, to maximize a throughput without causing congestion. At present, with an increase in a requirement for a throughput, there are already multiple mature window adjustment algorithms, including a Reno algorithm, a CUBIC algorithm, and the like.

For example, the Reno algorithm is the most widely used and mature TCP congestion control algorithm. A slow start mechanism, a congestion avoidance mechanism, a fast retransmit mechanism, and a fast recovery mechanism that are included in this algorithm are the bases of many existing algorithms. In an operation mechanism of the Reno algorithm, to keep a dynamic balance, a loss of a particular quantity of TCP data packets needs to be generated periodically, and an Additive Increase Multiplicative Decrease (AIMD) mechanism (that is, additive increase, multiplicative decrease) is also provided. Reduction in a congestion window caused by a loss of one TCP data packet needs to be recovered for a relatively long time, and bandwidth utilization is not high. Especially, in a case of a large congestion window, such a disadvantage is more obvious. For the Reno algorithm, when a loss of one TCP data packet is detected, a congestion window is immediately reduced to half in size. In a congestion recovery stage, after an RTT of data transmission in each congestion window, the congestion window is increased by 1 MSS (that is, an increase is 1 MSS), and it takes a relatively long time to perform recovery from the half of the size of the congestion window that exists when the TCP data packet is lost. For example, if a network has a network bandwidth of 100 Mbit/s and a delay of 100 milliseconds, when a throughput approaches the network bandwidth, a congestion window value is approximately 863 MSSs, and 431 rounds of RTTs are required by using the Reno algorithm, so that the congestion window that exists when the TCP data packet is lost can be recovered from the half of the size, and approximately 43.1 seconds are taken. Compared with the Reno algorithm, the CUBIC algorithm has made an improvement in the aspect of growth of a congestion window. In the CUBIC algorithm, a congestion window that exists when a TCP data packet is lost is recorded. When the recorded congestion window is not reached, the window grows in an exponential manner similar to that in a slow start. When the recorded congestion window is about to be reached, an increase step size of the congestion window is greatly reduced. After the increase step size, obtained after reduction, of the congestion window is kept for a period of time, the increase step size of the congestion window is readjusted to approximately exponential rapid growth. If the period of time is only kept occasionally, in the CUBIC algorithm, when the congestion window still grows rapidly after the period of time, more TCP data packets are inevitably lost as network congestion occurs again, further causing deterioration in a network state.

Therefore, the two algorithms (including the Reno algorithm and the CUBIC algorithm) for the TCP congestion control have a same disadvantage as follows: A congestion window grows according to a preset fixed value, and a current desirable network bandwidth cannot be effectively utilized, or even an adjustment policy that is contradictory to an actual network state may be used during adjustment of a congestion window, thereby affecting a requirement of an application for a throughput.

SUMMARY

In view of this, embodiments of the present invention provide a method and an apparatus for sending a Transmission Control Protocol (TCP) data packet and a system, so as to adjust a congestion window according to a throughput expected to be obtained for a service and a round-trip time of sending a TCP data packet, and control sending of a TCP data packet by using the adjusted congestion window, thereby meeting a throughput of the service as much as possible.

According to a first aspect, an embodiment of the present invention provides a method for sending a Transmission Control Protocol (TCP) data packet, where the method includes:

obtaining a first round-trip time of sending a TCP data packet in a network;

determining a second round-trip time, where the second round-trip time is a round-trip time that exists when a congestion window that is determined according to a first algorithm and a congestion window that is determined according to a second algorithm have an equal size, where in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet;

if the first round-trip time is longer than the second round-trip time, using the congestion window determined according to the first algorithm as a first congestion window; or if the first round-trip time is shorter than or equal to the second round-trip time, using the congestion window determined according to the second algorithm as the first congestion window; and sending the TCP data packet by using the first congestion window.

With reference to the first aspect, in a first possible implementation manner, the increase step size of the congestion window determined in the second algorithm is positively correlated with the target throughput and is negatively correlated with the first round-trip time, and the increase step size of the congestion window determined in the first algorithm is negatively correlated with the first round-trip time.

With reference to the first aspect or any foregoing possible implementation manner of the first aspect, in a second possible implementation manner, the target throughput is determined according to a bit rate, which is obtained by parsing a packet in the TCP data packet, of the service.

With reference to the second possible implementation manner of the first aspect, in a third possible implementation manner, an algorithm of determining the target throughput according to the bit rate, which is obtained by parsing the packet in the TCP data packet, of the service is: the target throughput is equal to a product of the bit rate of the service and an expansion coefficient, where the expansion coefficient is greater than 1.

With reference to the first aspect or any foregoing possible implementation manner of the first aspect, in a fourth possible implementation manner, the method further includes:

if a packet loss occurs in a process of sending the TCP data packet, adjusting, to a second congestion window according to a third algorithm, a congestion window of transmitting the TCP data packet, where the second congestion window is determined according to a third round-trip time that exists when the packet loss occurs on the TCP data packet, and a decrease step size of adjusting, to the second congestion window, the congestion window of transmitting the TCP data packet is negatively correlated with the third round-trip time; and sending the TCP data packet by using the second congestion window.

With reference to the fourth possible implementation manner of the first aspect, in a fifth possible implementation manner, the adjusting, to a second congestion window according to a third algorithm, a congestion window of transmitting the TCP data packet specifically includes:

if the third round-trip time is equal to a lower limit of a delay interval, using a congestion window that exists when the packet loss occurs on the TCP data packet as the second congestion window; or if the third round-trip time is equal to an upper limit of the delay interval, using a preset congestion window as the second congestion window, where the upper limit of the delay interval is a retransmission timeout (RTO) of the TCP in the network, and the lower limit of the delay interval is a round-trip time that exists when the network has light load.

With reference to the first aspect or any foregoing possible implementation manner of the first aspect, in a sixth possible implementation manner, the using the congestion window determined according to the first algorithm as a first congestion window specifically includes:

if the first round-trip time is equal to the round-trip time that exists when the network has light load, using a fast recovery value as a value of the increase step size of the congestion window, to obtain the first congestion window, where the fast recovery value has an order of magnitude same as that of a slow start;

if the first round-trip time is equal to a retransmission timeout (RTO) of the TCP in the network, using one maximum segment size (MSS) as a value of the increase step size of the congestion window, to obtain the first congestion window; or if the first round-trip time changes within an interval between the round-trip time that exists when the network has light load and a retransmission timeout (RTO) of the TCP in the network, setting a value of the increase step size of the congestion window to be between one MSS and the fast recovery value and be negatively correlated with the first round-trip time, to obtain the first congestion window.

With reference to the first aspect or any foregoing possible implementation manner of the first aspect, in a seventh possible implementation manner, the using the congestion window determined according to the second algorithm as the first congestion window specifically includes:

calculating a target window according to the target throughput and the first round-trip time, and using a difference between the target window and a current congestion window of the TCP in the network as the value of the increase step size of the congestion window, to determine the first congestion window.

With reference to the first aspect or any foregoing possible implementation manner of the first aspect, in an eighth possible implementation manner, the method further includes:

detecting an actual throughput of sending the TCP data packet in the network; and if a ratio of the actual throughput to the target throughput is greater than a first threshold, and a difference between a fourth round-trip time of sending the TCP data packet in the network and a round-trip time detected when the network has light load is less than a second threshold, increasing the target throughput; or if a ratio of the actual throughput to the target throughput is less than a third threshold, and a difference between a fourth round-trip time and a round-trip time detected when the network has light load is greater than a fourth threshold, reducing the target throughput.

With reference to the first aspect or any foregoing possible implementation manner of the first aspect, in a ninth possible implementation manner, the target throughput is transferred to a TCP protocol stack by using a target throughput parameter.

According to a second aspect, an embodiment of the present invention provides an apparatus for sending a Transmission Control Protocol (TCP) data packet, where the apparatus includes:

a delay determining unit, configured to: obtain a first round-trip time of sending a TCP data packet in a network, and determine a second round-trip time, where the second round-trip time is a round-trip time that exists when a congestion window that is determined according to a first algorithm and a congestion window that is determined according to a second algorithm have an equal size, where in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet;

a window adjustment unit, configured to: if the first round-trip time is longer than the second round-trip time, use the congestion window determined according to the first algorithm as a first congestion window; or if the first round-trip time is shorter than or equal to the second round-trip time, use the congestion window determined according to the second algorithm as the first congestion window; and a data packet sending unit, configured to send the TCP data packet by using the first congestion window.

With reference to the second aspect, in a first possible implementation manner, the increase step size of the congestion window determined in the second algorithm is positively correlated with the target throughput and is negatively correlated with the first round-trip time, and the increase step size of the congestion window determined in the first algorithm is negatively correlated with the first round-trip time.

With reference to the second aspect or any foregoing possible implementation manner of the second aspect, in a second possible implementation manner, the target throughput is determined according to a bit rate, which is obtained by parsing a packet in the TCP data packet, of the service.

With reference to the second possible implementation manner of the second aspect, in a third possible implementation manner, an algorithm of determining the target throughput according to the bit rate, which is obtained by parsing the packet in the TCP data packet, of the service is: the target throughput is equal to a product of the bit rate of the service and an expansion coefficient, where the expansion coefficient is greater than 1.

With reference to the second aspect or any foregoing possible implementation manner of the second aspect, in a fourth possible implementation manner, the window adjustment unit is further configured to: if a packet loss occurs in a process of sending the TCP data packet, adjust, to a second congestion window according to a third algorithm, a congestion window of transmitting the TCP data packet, where the second congestion window is determined according to a third round-trip time that exists when the packet loss occurs on the TCP data packet, and a decrease step size of adjusting, to the second congestion window, the congestion window of transmitting the TCP data packet is negatively correlated with the third round-trip time; and the data packet sending unit is further configured to send the TCP data packet by using the second congestion window.

With reference to the fourth possible implementation manner of the second aspect, in a fifth possible implementation manner, that the window adjustment unit is further configured to adjust, to a second congestion window according to a third algorithm, a congestion window of transmitting the TCP data packet is specifically:

the window adjustment unit is configured to: if the third round-trip time is equal to a lower limit of a delay interval, use a congestion window that exists when the packet loss occurs on the TCP data packet as the second congestion window; or if the third round-trip time is equal to an upper limit of the delay interval, use a preset congestion window as the second congestion window, where the upper limit of the delay interval is a retransmission timeout (RTO) of the TCP in the network, and the lower limit of the delay interval is a round-trip time that exists when the network has light load.

With reference to the second aspect or any foregoing possible implementation manner of the second aspect, in a sixth possible implementation manner, that the window adjustment unit is configured to use the congestion window determined according to the first algorithm as a first congestion window specifically includes:

the window adjustment unit is configured to: if the first round-trip time is equal to the round-trip time that exists when the network has light load, use a fast recovery value as a value of the increase step size of the congestion window, to obtain the first congestion window, where the fast recovery value has an order of magnitude same as that of a slow start;

the window adjustment unit is configured to: if the first round-trip time is equal to a retransmission timeout (RTO) of the TCP in the network, use one maximum segment size (MSS) as a value of the increase step size of the congestion window, to obtain the first congestion window; or the window adjustment unit is configured to: if the first round-trip time changes within an interval between the round-trip time that exists when the network has light load and a retransmission timeout (RTO) of the TCP in the network, set a value of the increase step size of the congestion window to be between one MSS and the fast recovery value and be negatively correlated with the first round-trip time, to obtain the first congestion window.

With reference to the second aspect or any foregoing possible implementation manner of the second aspect, in a seventh possible implementation manner, that the window adjustment unit is configured to use the congestion window determined according to the second algorithm as the first congestion window is specifically:

the window adjustment unit is configured to: calculate a target window according to the target throughput and the first round-trip time, and use a difference between the target window and a current congestion window of the TCP in the network as the value of the increase step size of the congestion window, to determine the first congestion window.

With reference to the second aspect or any foregoing possible implementation manner of the second aspect, in an eighth possible implementation manner, the apparatus further includes:

a throughput detection unit, configured to detect an actual throughput of sending the TCP data packet in the network; and a target throughput adjustment unit, configured to: if a ratio of the actual throughput to the target throughput is greater than a first threshold, and a difference between a fourth round-trip time of sending the TCP data packet in the network and a round-trip time detected when the network has light load is less than a second threshold, increase the target throughput; or if a ratio of the actual throughput to the target throughput is less than a third threshold, and a difference between a fourth round-trip time and a round-trip time detected when the network has light load is greater than a fourth threshold, reduce the target throughput.

With reference to the second aspect or any foregoing possible implementation manner of the second aspect, in a ninth possible implementation manner, the target throughput is transferred to a TCP protocol stack by using a target throughput parameter.

According to a third aspect, an embodiment of the present invention provides an apparatus for sending a Transmission Control Protocol (TCP) data packet, where the sending apparatus includes a processor, a memory, and a network interface, where the processor is connected both to the memory and the network interface by using a bus; and the memory is configured to store a computer execution instruction, and when the sending apparatus runs, the processor reads the computer execution instruction stored in the memory, to perform the method for sending a Transmission Control Protocol (TCP) data packet according to the first aspect or any foregoing possible implementation manner based on the first aspect.

According to a fourth aspect, an embodiment of the present invention provides a system, where the system includes a server and a terminal, where the server is in communication connection with the terminal by using a network; and the server is the apparatus for sending a Transmission Control Protocol (TCP) data packet provided in the second aspect or in any foregoing possible implementation manner based on the second aspect or in the third aspect, and sends a TCP data packet to the terminal by using the network.

According to a fifth aspect, an embodiment of the present invention provides a system, where the system includes a server, a first agent device, and a terminal, where the first agent device is in communication connection both with the server and the terminal;

the server is configured to send a TCP data packet to the terminal by using the first agent device that acts as an agent; and the first agent device is the apparatus for sending a Transmission Control Protocol (TCP) data packet provided in the second aspect or in any foregoing possible implementation manner based on the second aspect or in the third aspect, and is configured to: receive the TCP data packet sent by the server to the terminal, and act as an agent of the server to send the TCP data packet to the terminal.

With reference to fifth aspect, in a first possible implementation manner, the terminal is configured to transfer a target throughput from a TCP protocol stack of the terminal to a TCP protocol stack of the first agent device by using a target throughput parameter.

According to a sixth aspect, an embodiment of the present invention provides a system, where the system includes a server, a first agent device, a second agent device, and a terminal, where the first agent device is in communication connection both with the server and the second agent device;

the server is configured to send a TCP data packet to the terminal by using the first agent device that acts as an agent;

the first agent device is the apparatus for sending a Transmission Control Protocol (TCP) data packet provided in the second aspect or in any foregoing possible implementation manner based on the second aspect or in the third aspect, and is configured to: receive the TCP data packet sent by the server to the terminal, and act as an agent of the server to send the TCP data packet to the second agent device; and the second agent device is configured to: receive the TCP data packet and forward the TCP data packet to the terminal.

With reference to the sixth aspect, in a first possible implementation manner, the terminal is configured to transfer a target throughput from a TCP protocol stack of the terminal to a TCP protocol stack of the second agent device by using a target throughput parameter; and the second agent device is further configured to transfer the target throughput from the TCP protocol stack of the second agent device to a TCP protocol stack of the first agent device by using the target throughput parameter.

By means of the foregoing solutions, a first congestion window is determined according to a target throughput and a first round-trip time that reflects a current network state, the first congestion window is used to update a current congestion window, and the first congestion window is used in the current network state to control sending of a TCP data packet, so that a throughput expected to be obtained for a service can be met as much as possible. In accordance with a target throughput and a network state, a current congestion window directly grows to a first congestion window at one go, so that a requirement of a service for a throughput can be better met, and a network bandwidth can be utilized more effectively.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1A:
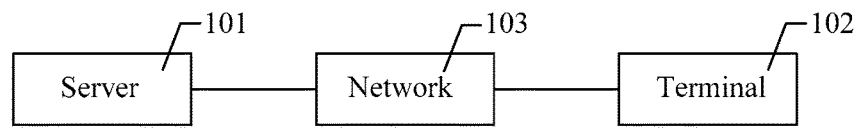
FIG. 1A is a schematic diagram of a system logical structure of an application scenario of a method for sending a Transmission Control Protocol (TCP) data packet.

FIG. 1A is a schematic diagram of a system logical structure of an application scenario of a method for sending a Transmission Control Protocol (TCP) data packet according to an embodiment of the present invention. For ease of description, only parts related to this embodiment of the present invention are provided. As shown in FIG. 1A, referring to a system 100 provided in FIG. 1A, the system 100 includes a server 101, a terminal 102, and a network 103. The server 101 and the terminal 102 are connected by using the network 103, and data is exchanged between the server 101 and the terminal 102 by using the network 103. The server 101 may send a TCP data packet to the terminal 102 by using the network 103, and the terminal 102 may also send a TCP data packet to the server 101 by using the network 103. The network 103 is established based on the Transmission Control Protocol/Internet Protocol (TCP/IP), and the Transmission Control Protocol/Internet Protocol is also referred to as a network communications protocol.

Optionally, the network 103 may include a forwarding device, such as a switch or a router, for forwarding a TCP data packet. A TCP data packet exchanged between the server 101 and the terminal 102 is forwarded by using the forwarding device.

Optionally, the server described in this embodiment of the present invention is an electronic device that includes electronic components and that has a data processing function. The electronic device includes electronic elements such as an integrated circuit, a transistor, and an electron tube. Software that consists of a program instruction can be run on the electronic device to implement functions such as data processing and control of another device. For example, after an operating system is installed on the electronic device, if a network interface card is mounted on the electronic device and network configuration is complete, the electronic device may access a network built based on the TCP/IP protocol, and exchange a TCP data packet with another electronic device (for example, a terminal), so as to exchange data.

Optionally, similar to the server, the terminal described in this embodiment of the present invention is an electronic device that includes electronic components and that has a data processing function. The terminal may access a network built based on the TCP/IP protocol, and exchange a TCP data packet with another electronic device (for example, a server), so as to exchange data.

Optionally, the server 101 is directly in communication connection with the terminal 102. The TCP data packet exchanged between the server 101 and the terminal 102 by using the network 103 does not need to be forwarded by a forwarding device (for example, a router) in the network 103.

Optionally, the server 101 may perform peer interaction of a TCP data packet with the terminal 102. The server 101 may send a TCP data packet to the terminal 102, and correspondingly, the terminal 102 may also send a TCP data packet to the server 101.

Optionally, in the system 100 provided in FIG. 1A, the server 101 performs server-client interaction of a TCP data packet with the terminal 102 by using the network 103. The server 101 acts as a serving end, and the terminal 102 acts as a client corresponding to the serving end in server-client communication. The server 101 may send a TCP data packet to the terminal 102. For example, when the terminal 102 downloads an audio file and a video file from the server 101, the server 101 sends, to the terminal 102, a TCP data packet carrying the audio file and the video file. Correspondingly, the terminal 102 may also send a TCP data packet to the server 101. For example, when the terminal 102 uploads a text file to the server 101, the terminal 102 sends, to the server 101, a TCP data packet carrying the text file.

Figure 1B:
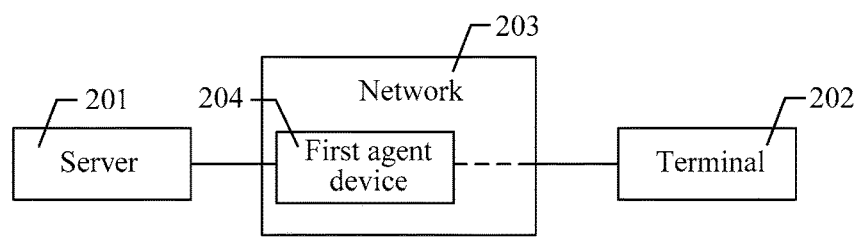
FIG. 1B is a schematic diagram of another system logical structure of an application scenario of a method for sending a Transmission Control Protocol (TCP) data packet.

FIG. 1B is a schematic diagram of another system logical structure of an application scenario of a method for sending a Transmission Control Protocol (TCP) data packet according to an embodiment of the present invention. For ease of description, only parts related to this embodiment of the present invention are provided. Referring to a system 200 provided in FIG. 1B, the system 200 includes a server 201, a terminal 202, a network 203, and a first agent device 204. In a process in which the server 201 exchanges a TCP data packet with the terminal 202 by using the network 203, if modification of a TCP protocol stack of the server 201 is not supported, the first agent device 204 is added. The first agent device 204 supports modification of a TCP protocol stack of the first agent device 204. The first agent device 204 acts as an agent of the server 201 to exchange the TCP data packet with the terminal 202. Interaction of a TCP data packet between the first agent device 204 and the terminal 202 in FIG. 1B is similar to interaction of a TCP data packet between the server 101 and the terminal 102 in FIG. 1A. Certainly, the first agent device 204 may also be added because of another factor. For example, the first agent device 204 is added to reduce load caused by sending a TCP data packet by the server 201. Preferably, the first agent device 204 is implemented by using a proxy server. Preferably, the first agent device 204 is a service card on a router, and the foregoing functions are implemented by performing logic programming on the service card.

Figure 1C:
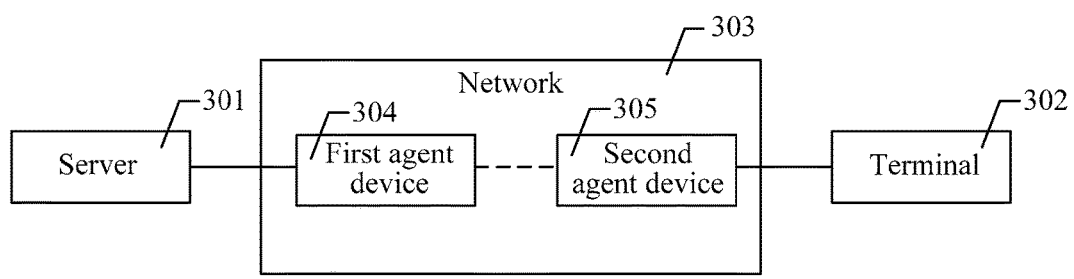
FIG. 1C is a schematic diagram of another system logical structure of an application scenario of a method for sending a Transmission Control Protocol (TCP) data packet.

FIG. 1C is a schematic diagram of another system logical structure of an application scenario of a method for sending a Transmission Control Protocol (TCP) data packet according to an embodiment of the present invention. For ease of description, only parts related to this embodiment of the present invention are provided. Referring to a system 300 provided in FIG. 1C, the system 300 includes a server 301, a terminal 302, a network 303, and a first agent device 304. In a process in which the server 301 exchanges a TCP data packet with the terminal 302 by using the network 303, if modification of a TCP protocol stack of the server 301 is not supported, the first agent device 304 is added. The first agent device 304 supports modification of a TCP protocol stack of the first agent device 304. The first agent device 304 acts as an agent of the server 301 to exchange the TCP data packet. In addition, a second agent device 305 may be further added. The second agent device 305 acts as an agent of the terminal 302 to exchange the TCP data packet, so that the TCP data packet is exchanged between the first agent device 304 and the second agent device 305. Interaction of a TCP data packet between the first agent device 304 and the second agent device 305 in FIG. 1C is similar to interaction of a TCP data packet between the server 101 and the terminal 102 in FIG. 1A. Certainly, both the first agent device 304 and the second agent device 305 may also be added because of another factor. Reference is made to the foregoing, and details are not described herein again. A reason for adding the second agent device 305 is: Modification of a TCP protocol stack of the terminal 302 is not supported, and the second agent device 305 supports modification of a TCP protocol stack of the second agent device 305. The second agent device 305 acts as an agent of the terminal 302 to exchange the TCP data packet, so that the TCP data packet is exchanged between the first agent device 304 and the second agent device 305. Preferably, the first agent device 304 is implemented by using a proxy server. Preferably, the first agent device 304 is a service card on a router, and the foregoing functions are implemented by performing logic programming on the service card. Preferably, the second agent device 305 is implemented by using a proxy server. Preferably, the second agent device 305 is a service card on a router, and the foregoing functions are implemented by performing logic programming on the service card.

In this embodiment of the present invention, in a process in which a server sends a TCP data packet to a terminal in a network, to meet as much as possible a throughput expected to be obtained for a service, a method for sending a TCP data packet of the TCP is designed. It should be noted that in FIG. 1A, the method provided in this embodiment of the present invention is applied to the server 101. In FIG. 1B, the method provided in this embodiment of the present invention is applied to the first agent device 204. In FIG. 1C, the method provided in this embodiment of the present invention may be applied to the first agent device 304.

Figure 2:
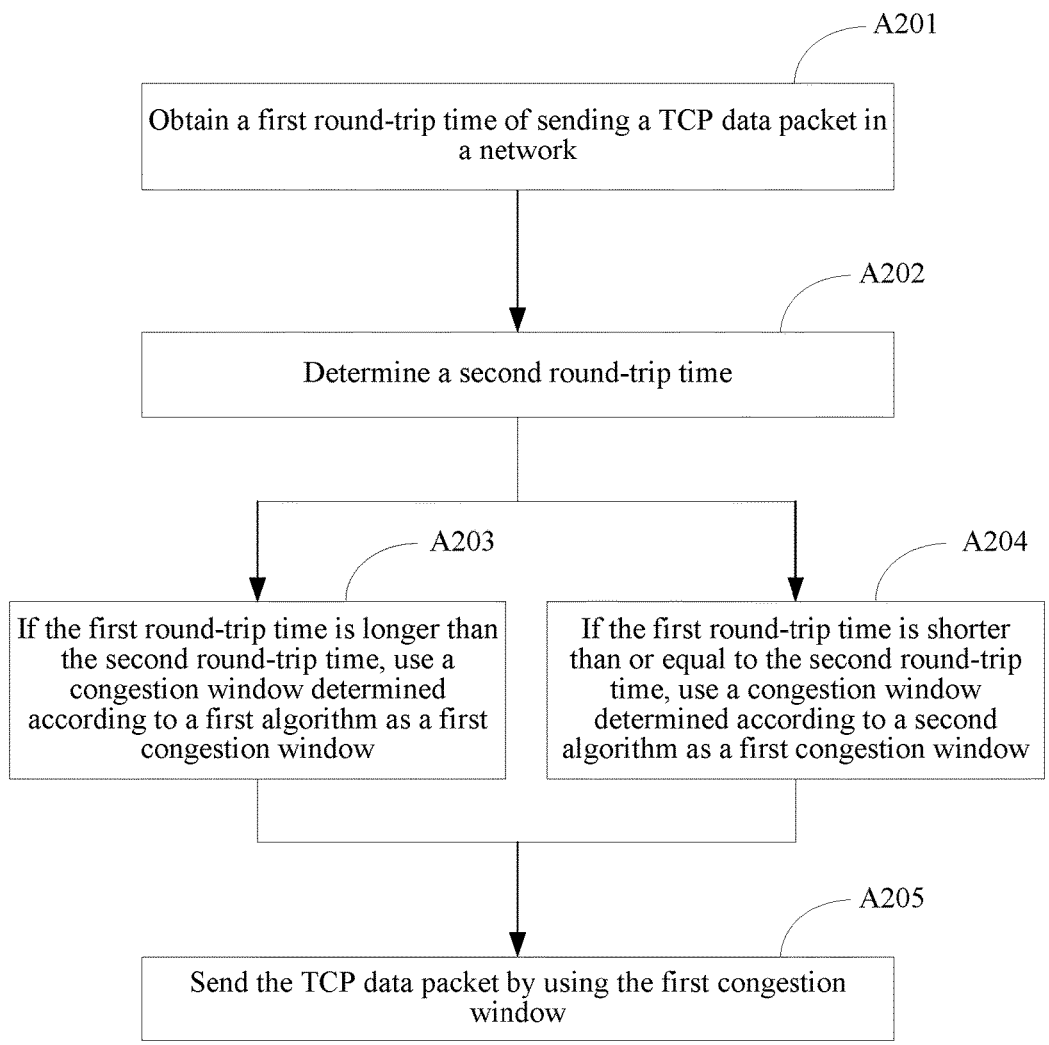
FIG. 2 is a flowchart of a method for sending a Transmission Control Protocol (TCP) data packet.

The following details a method for sending a TCP data packet of the TCP provided in an embodiment of the present invention by using an example in which the method provided in this embodiment of the present invention is applied to the server 101. FIG. 2 shows a basic implementation procedure for the method. However, for ease of description, FIG. 2 shows only parts related to this embodiment of the present invention.

The method for sending a TCP data packet of the TCP shown in FIG. 2 includes: step A201, step A202, step A203, step A204, and step A205.

Step A201: Obtain a first round-trip time (RTT) of sending a TCP data packet in a network.

An example in which the method provided in this embodiment of the present invention is applied to the server 101 in FIG. 1A is used for describing step A201 in detail:

When a server provides a service for a terminal, a TCP flow is established separately for each provided service. A TCP data packet carrying a corresponding service is sent in each TCP flow. In a process of sending the TCP data packet, in step A201, each time one acknowledgment (ACK) of the TCP data packet is received, an RTT required to send the TCP data packet is calculated. The calculated RTT is used as the first round-trip time. Optionally, an algorithm (a Jacobson/Karels algorithm) provided in the RFC6289 is used to calculate the RTT for the TCP data packet.

Step A202: Determine a second round-trip time, where the second round-trip time is a round-trip time that exists when a congestion window that is determined according to a first algorithm and a congestion window that is determined according to a second algorithm have an equal size, where in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet.

It should be noted that a specific form of the service is not limited in this embodiment of the present invention, and the service includes various application services such as an audio service, a video service, an audio and video service, a service for scanning and removing a virus online, an instant messaging service, and an online application service.

In a process that the server provides a service for the terminal, if it is expected to provide the service normally, a particular throughput is needed when the server sends the TCP data packet carrying the service. In this embodiment of the present invention, the throughput is defined as a target throughput. In the process that the server provides the service for the terminal, a TCP flow is established for the service, and a congestion window is established for the TCP flow. The TCP data packet carrying the service is sent by using the TCP flow under the control of the congestion window, and the throughput that the server can provide is determined by using the congestion window. Therefore, to reach as much as possible the throughput needed by the service in a current network state of a network, the congestion window needs to be adjusted. Similarly, if the server provides multiple services for the terminal at the same time, a target throughput separately needed by each service provided by the server to the terminal is separately determined. A TCP flow is separately established for each service, one congestion window is separately set for each TCP flow, and a corresponding congestion window is further adjusted separately for each service to provide a throughput expected to be obtained for the service.

The first algorithm and the second algorithm are provided in this embodiment of the present invention. A size of a congestion window is adjusted by using the first algorithm or the second algorithm and according to a network state of a network and a target throughput needed by a service. The congestion window obtained by means of adjustment is used to control sending of the TCP data packet, to enable the terminal to obtain an expected throughput. Specifically, in step A202, an increase step size of the congestion window is determined according to the first algorithm or the second algorithm, so that the size of the congestion window is adjusted.

In addition, specifically, whether the first algorithm or the second algorithm is used to adjust the congestion window is determined according to an RTT that reflects a network state. In step A202, the second round-trip time is determined. If the RTT that reflects the network state is shorter than or equal to the second round-trip time, that is, the RTT that reflects the network state is relatively short, a current network state is desirable, and the second algorithm is used to determine the increase step size of the congestion window. When the second algorithm is used to determine the increase step size of the congestion window, the increase step size needs to be determined according to both the RTT that reflects the network state and the target throughput. That is, both the network state and the target throughput are considered in the second algorithm. Generally, when the congestion window determined according to the second algorithm is used to control sending of the TCP data packet, the server can provide the target throughput needed by the service. If the RTT that reflects the network state is longer than the second round-trip time, that is, the RTT that reflects the network state is relatively long, congestion exists in a current network state to some extent, and the first algorithm is used to determine the increase step size of the congestion window. When the first algorithm is used to determine the increase step size of the congestion window, the increase step size is determined according to the RTT that reflects the network state. That is, the network state is considered more in the first algorithm. Generally, when the congestion window determined according to the second algorithm is used to control sending of the TCP data packet, the throughput provided by the server cannot reach the target throughput needed by the service.

Step A203: If the first round-trip time is longer than the second round-trip time, use the congestion window determined according to the first algorithm as a first congestion window.

Step A204: If the first round-trip time is shorter than or equal to the second round-trip time, use the congestion window determined according to the second algorithm as the first congestion window.

Step A205: Send the TCP data packet by using the first congestion window.

Specifically, in a process of sending, in the network, the TCP data packet carrying the service, if a congestion window currently needs to be adjusted according to the target throughput and the RTT that reflects a current network state, to enable the server to provide a throughput that meets the service as much as possible, step A201 is performed first to calculate the RTT that reflects a current network state, and the calculated RTT is used as the first round-trip time.

If the first round-trip time that reflects the current network state is relatively long, and the first round-trip time is longer than the second round-trip time, indicating that congestion exists in the current network state to some extent, step A203 is performed to determine the increase step size of the congestion window by using the first algorithm and according to the first round-trip time. On the basis of the corresponding congestion window during detection of the first round-trip time, the increase step size determined according to the first algorithm is increased to obtain the first congestion window.

If the first round-trip time that reflects the current network state is relatively short, and the first round-trip time is shorter than or equal to the second round-trip time, indicating that the current network state is desirable, step A204 is performed to determine the increase step size of the congestion window by using the second algorithm and according to both the first round-trip time and the target throughput. On the basis of the corresponding congestion window during detection of the first round-trip time, the increase step size determined according to the second algorithm is increased to obtain the first congestion window.

In a TCP flow of a service, for a congestion window that controls sending of a TCP data packet of the service, each time step A204 or step A205 is performed, the first congestion window is determined once again, so that the first congestion window is used to update the congestion window corresponding to the service once, and the first congestion window is used to replace the congestion window before updating. In the TCP flow of the service, it is updated to that the first congestion window is used to control a quantity of to-be-sent TCP data packets.

It should be noted that, in a TCP flow of a service, for a congestion window used to control sending of a TCP data packet of the service, a time point or condition for triggering determining of the first congestion window according to the first round-trip time and the target throughput and updating of the current congestion window by using the first congestion window is not limited in this embodiment of the present invention. For example, the first congestion window may be determined in real time according to the first round-trip time and the target throughput, and the first congestion window is used to update the current congestion window of the TCP flow of the service. For another example, the first congestion window may be determined at an interval of a specified time according to the first round-trip time and the target throughput, and the first congestion window is used to update the current congestion window. For another example, after a packet loss occurs on the TCP data packet and the congestion window is reduced to a second congestion window, if acknowledgments (ACK) of controlling sending of the TCP data packets by using the second congestion window in a first round are normally received, the first congestion window is determined according to the first round-trip time and the target throughput, and the first congestion window is used to update the current congestion window.

Therefore, in the current network state that is reflected by the first round-trip time, in this embodiment of the present invention, the first congestion window that meets a target throughput as much as possible can be obtained by means of adjustment according to the target throughput expected to be obtained for a service, and the first congestion window is used to control sending of a TCP data packet, so that the target throughput expected to be obtained for the service can be provided as much as possible.

The following details the method provided in this embodiment of the present invention based on the server 101 in FIG. 1A and by using an example in which after a packet loss occurs in a TCP flow of a service provided by a server to a terminal, a congestion window is adjusted by using the method provided in this embodiment of the present invention:

First, a target throughput required for sending the TCP data packet of the service in a network is obtained, and the target throughput is added to the TCP protocol stack.

Specifically, if the server provides the service for the terminal normally, a particular throughput is needed by the server to send the TCP data packet carrying the service. The throughput needed by the service is defined as the target throughput.

When the server provides the service for the terminal, a TCP flow is established for the service; therefore, the server sends, in the TCP flow, the TCP data packet carrying the service. In addition, in a process in which the server provides the service for the terminal, one congestion window is further established for the TCP flow. The congestion window is used to control sending of the TCP data packet carrying the service in the TCP flow. A maximum quantity of TCP data packets that can be sent is determined by the congestion window; therefore, a throughput provided by the server for the service may be adjusted by adjusting a size of the congestion window.

The parameter, that is, the target throughput, is not provided in an existing TCP protocol stack. Therefore, to adjust the congestion window according to the target throughput, the TCP protocol stack of the server needs to be modified by adding the parameter, that is, the target throughput. The server 101 in FIG. 1A supports modification of a TCP protocol stack of the server 101. In addition, in a process in which the server provides the service for the terminal, the server directly sends, to the terminal, the TCP data packet carrying the service, instead of using the first agent device as an agent of the server to send, to the terminal, the TCP data packet carrying the service, as shown in FIG. 1B. In this way, when the server provides a service only for the terminal, the server adjusts the congestion window according to the target throughput in the TCP protocol stack and the first round-trip time that reflects a current network state.

Optionally, in an optional implementation manner for adding the target throughput to the TCP protocol stack of the server 101 in FIG. 1A, a socket is modified by adding a parameter, that is, a target throughput parameter. After the server provides, for the terminal, the target throughput needed by the server, the determined target throughput is used to assign a value of the target throughput parameter, the target throughput parameter and the assigned value (that is, the target throughput expected to be obtained for the service) corresponding to the target throughput parameter are transmitted to the TCP protocol stack of the server by using the socket, and the target throughput parameter and the assigned value corresponding to the target throughput parameter are then added to the TCP protocol stack.

For example, the target throughput parameter "target_throughput" is added to the socket function "setsockopt ( )". After the target throughput expected to be obtained for the service is determined according to the throughput needed by the server to provide the service for the terminal, the determined target throughput is used to assign a value of the "target_throughput". The "target_throughput" and the assigned value of the "target_throughput" are transmitted to the TCP protocol stack of the server by using the "setsockopt ( )", and the target throughput parameter "target_throughput" and the assigned value of the target throughput parameter "target_throughput" are then added to the TCP protocol stack.

Figure 3:
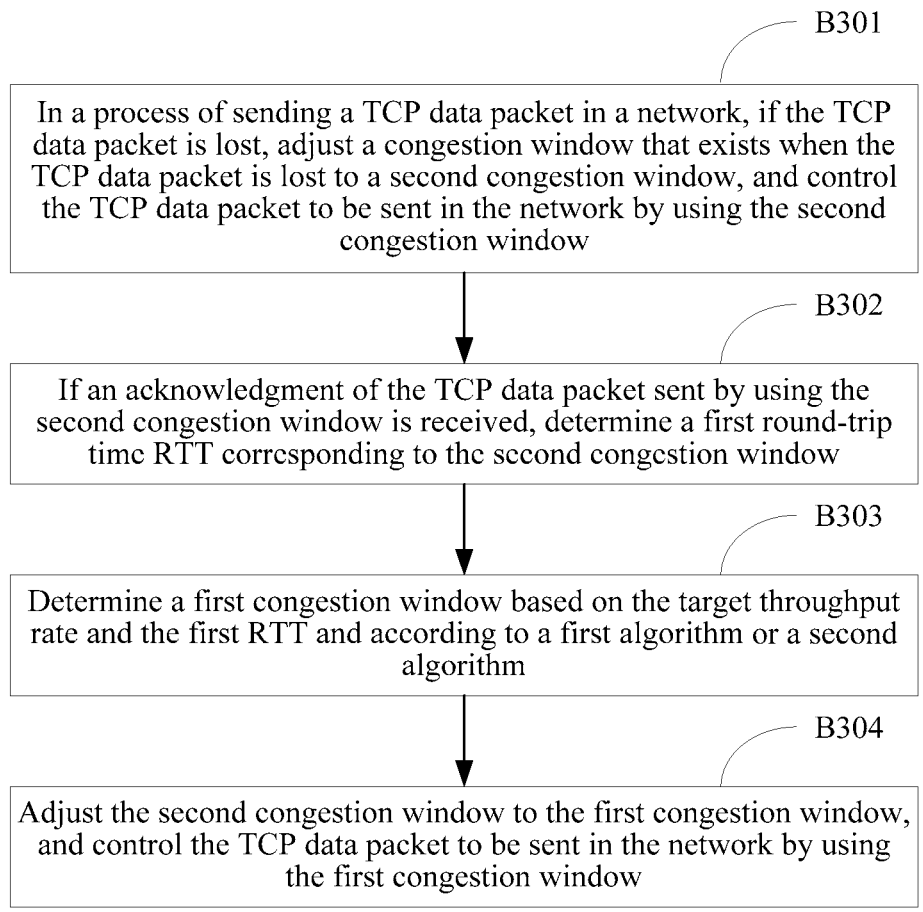
FIG. 3 is a working flowchart, which is based on a method for sending a TCP data packet, after a data packet is lost.

Subsequently, in a process of sending the TCP data packet in the network, if a loss of the TCP data packet occurs, step B301, step B302, step B303, and step B304 are sequentially performed, as shown in FIG. 3.

Step B301: In a process of sending the TCP data packet in the network, if the TCP data packet is lost, adjust a congestion window that exists when the TCP data packet is lost to a second congestion window, and control the TCP data packet to be sent in the network by using the second congestion window.

Specifically, in a process of sending, in the TCP flow of the service provided by the server to the terminal, the TCP data packet carrying the service, when the terminal correctly and sequentially receives a TCP data packet, the terminal feeds back, to the server, an acknowledgment (ACK) corresponding to the TCP data packet. After receiving the acknowledgment of the TCP data packet, the server then deletes the TCP data packet from a cache, and adds, in the cache, another to-be-sent TCP data packet. In this embodiment of the present invention, a congestion window is further set based on the cache, and the congestion window is used to perform congestion control. In a process of sending, in the TCP flow of the service, a TCP data packet in the congestion window, if a TCP data packet in the congestion window is lost, the congestion window of the TCP flow is reduced, and the congestion window is adjusted to the second congestion window. The second congestion window is less than a congestion window that exists when the TCP data packet is lost. A specific algorithm used to set the second congestion window is not limited, and is, for example, an existing Reno algorithm or CUBIC algorithm. In addition, how the server determines that a TCP data packet in the congestion window is lost is not limited, and a scenario in which a loss of a TCP data packet is triggered is not limited either. For example, after sending the TCP data packet, the server still receives no acknowledgment of the TCP data packet from the terminal after a preset time. For another example, after the server sends the TCP data packet, the TCP data packet is lost during transmission of the TCP data packet in the network, where the TCP data packet is, for example, a TCP data packet that is lost randomly during transmission of the TCP data packet in a wireless network. For another example, after the server sends the TCP data packet, the terminal does not feed back an acknowledgment of the TCP data packet in time. For another example, the server sequentially sends multiple TCP data packets to the terminal, the TCP data packets reach the terminal in a random time order, and the terminal has received multiple TCP data packets that are arranged in the end (for example, three TCP data packets that are arranged in the end), but still does not receive a TCP data packet that is arranged in the front. In this case, each time receiving each TCP data packet that is arranged in the end, the terminal sends, to the server, an acknowledgment (ACK) requesting a TCP data packet that is arranged in the front. After the server continuously receives the acknowledgment several times (for example, three times), the server determines that the TCP data packet that is arranged in the front is lost.

After a loss of the TCP data packet occurs, in step B301, the congestion window that exists when the TCP data packet is lost is adjusted to the second congestion window, and the second congestion window is used to control sending of the TCP data packet. A maximum quantity of TCP data packets that can be sent by the server in the network is determined by the second congestion window.

It should be noted that, if the network state deteriorates continuously (for example, a network bandwidth continuously decreases) or a problem occurs in the terminal to cause continuous losses of TCP data packets, step B301 may be sequentially performed multiple times. Certainly, if the network state does not change or is optimized (for example, the network bandwidth remains unchanged or increases), and no problem occurs in the terminal, step B302 is performed.

Step B302: If an acknowledgment of the TCP data packet sent by using the second congestion window is received, determine a first round-trip time corresponding to the second congestion window.

It should be noted that, the "first" in the "first congestion window" and the "second" in the "second congestion window" are both indications used only for distinguishing between each other.

Specifically, after the congestion window of the TCP that exists when the TCP data packet is lost is adjusted to the second congestion window in step B301, the server controls, in the TCP flow of the service by using the second congestion window, sending of the TCP data packet of the service to the terminal. If the server completes sending of the TCP data packets in the second congestion window to the terminal in a first round and receives acknowledgments of all TCP data packets sent in the first round, the server calculates an RTT of the last TCP data packet in the second congestion window in the first round, and defines the calculated RTT as a first round-trip time.

For example, after the server completes sending of the TCP data packets in the second congestion window to the terminal in the first round and receives the acknowledgments of all the TCP data packets sent in the first round, an algorithm (Jacobson/Karels algorithm) provided in the RFC6289 is used to calculate an RTT of an acknowledgment that is received last (the last received acknowledgment of acknowledgments of all the TCP data packets sent in the first round), and the calculated RTT is used as a first round-trip time.

Step B303: Determine a first congestion window based on the target throughput and the first round-trip time and according to a first algorithm or a second algorithm.

Specifically, when the network does not have light load but has particular load, the first round-trip time is strongly correlated with a reflected current network state (for example, a network path length of forwarding a TCP data packet in the network). A better network state indicates a shorter first round-trip time. In an extreme case, when the network is severely overloaded, the first round-trip time is equal to a retransmission timeout (RTO) mechanism of the network, and the network has severe congestion.

If an acknowledgment of a TCP data packet in the second congestion window in the first round is received in step B302, it indicates that the network may allow transmission of more TCP data packets. In this case, the second congestion window may be properly increased, and the second congestion window is increased to the first congestion window.

In this embodiment of the present invention, the first algorithm or the second algorithm is used to determine the first congestion window. Particularly, in the second algorithm, the parameter, that is, the target throughput, is introduced, and the parameter, that is, the first round-trip time, is introduced at the same time. A current network state that is determined according to the first round-trip time is relatively desirable. Therefore, for the first congestion window determined according to the second algorithm, the first congestion window is used to control sending of the TCP data packet, so that the terminal can obtain the expected target throughput when the server sends the TCP data packet carrying the service. In addition, when the first congestion window determined according to the first algorithm is used to control sending of the TCP data packet, a throughput that exists when the server provides the service can also be improved as much as possible in a current network state, so that the terminal obtains a maximum throughput in the current network state.

Step B304: Adjust the second congestion window to the first congestion window, and control the TCP data packet to be sent in the network by using the first congestion window.

Specifically, after the first congestion window is used to replace the second congestion window in step B303, in step B304, the server controls, by using the first congestion window, the TCP data packet that carries the service and that is sent to the terminal. That is, at a time point, the server sends, to the terminal, all TCP data packets (the TCP data packets carrying the service) included in the first congestion window at most.

In this embodiment, the target throughput needed by the server to send the TCP data packet carrying the service is determined, and the target throughput is added to the TCP protocol stack. Further, in a TCP flow in which the server sends the TCP data packet to the terminal, if a loss of the TCP data packet occurs, the congestion window of the TCP is adjusted to the second congestion window. If TCP data packets in the second congestion window in the first round are successfully sent to the terminal (that is, acknowledgments of the TCP data packets in the second congestion window in the first round are received from the terminal), a first round-trip time corresponding to the second congestion window in the first round is determined. Therefore, in step B303, a network state (a network state of sending the TCP data packet in the second congestion window in the first round) can be determined according to the first round-trip time, and the first congestion window that meets the target throughput as much as possible is determined in the network state. Therefore, after the network state is determined according to the first round-trip time, in step B304, the second congestion window can be adjusted, at one go, to the first congestion window that meets the target throughput as much as possible, instead of gradually increasing the second congestion window according to an existing algorithm (for example, a Reno algorithm and a CUBIC algorithm) until the second congestion window is increased to the first congestion window.

It should be noted that, this method is particularly applicable to an occasion of a large network bandwidth. As a network bandwidth increases, compared with an existing algorithm, this method can better meet a service, and network bandwidth utilization is further improved. A detailed comparison is as follows:

In an existing window adjustment algorithm such as the Reno algorithm and the CUBIC algorithm, when a loss of a TCP data packet occurs, a congestion window of the TCP is greatly reduced. For example, in the Reno algorithm, when a TCP data packet is lost, a congestion window is reduced to half. For another example, in the CUBIC algorithm, when a TCP data packet is lost, a congestion window is reduced to 717/1024 (reduced by approximately one third). However, after the congestion window is reduced, when the server adjusts the congestion window by using an existing window adjustment algorithm, TCP data packets need to be sent by trial round by round. After a TCP data packet in each round is sent, if a TCP data packet sent in the round is also lost, the congestion window is greatly reduced once again. If an acknowledgment fed back by the terminal is successfully received, the congestion window is increased once. However, after an acknowledgment fed back by the terminal is successfully received in each round, a target throughput expected to be obtained for a service is not considered in an existing algorithm, but instead, the congestion window is gradually increased round by round according to the algorithm, and a maximum congestion window (the first congestion window) that can be provided for the service in a current network state is gradually reached.

Correspondingly, the target throughput expected to be obtained for the service is predetermined. Even if a loss of the TCP data packet occurs in a process in which the server sends the TCP data packet to the terminal, and the congestion window of the TCP is adjusted to the second congestion window, if TCP data packets in the second congestion window in the first round are successfully sent to the terminal, a first round-trip time corresponding to the second congestion window in the first round is determined, a network state is determined according to the first round-trip time, and the first congestion window that meets the target throughput as much as possible is then determined in the network state. The congestion window is increased, at one go, from the second congestion window to the first congestion window to meet the target throughput corresponding to the service as much as possible. If the network state of sending the TCP data packets in the second congestion window in the first round is desirable, when the network bandwidth meets the target throughput, sending of the TCP data packet by using the first congestion window can meet the target throughput. Even if the network state is undesirable, the first congestion window that is determined according to the first round-trip time and the target throughput is also a congestion window that meets a bit rate of the service to the maximum in the network state.

Optionally, this method is particularly applicable to a wireless network having a large network bandwidth. Compared with a wired network, a probability that a random packet loss occurs in a wireless network is relatively large. Each time a random packet loss occurs, a congestion window is reduced in an existing algorithm. However, each time after the congestion window is reduced, the congestion window can only slowly and gradually increase to the first congestion window. Consequently, a time delay for recovery to the congestion window that can normally provide a service for the terminal is relatively long, and a service provided by the server for the terminal normally is adversely affected. By contrast, even if a random packet loss occurs in a wireless network, each time after a random packet loss occurs, to support the service in this embodiment of the present invention, a congestion window that exists when a packet loss occurs is adjusted to the first congestion window only by using two steps. The two steps include: adjusting, to the second congestion window, the congestion window that exists when the random packet loss occurs, and adjusting the second congestion window to the first congestion window, so that a network bandwidth can be effectively utilized, and the service is supported as soon as possible.

Figure 4:
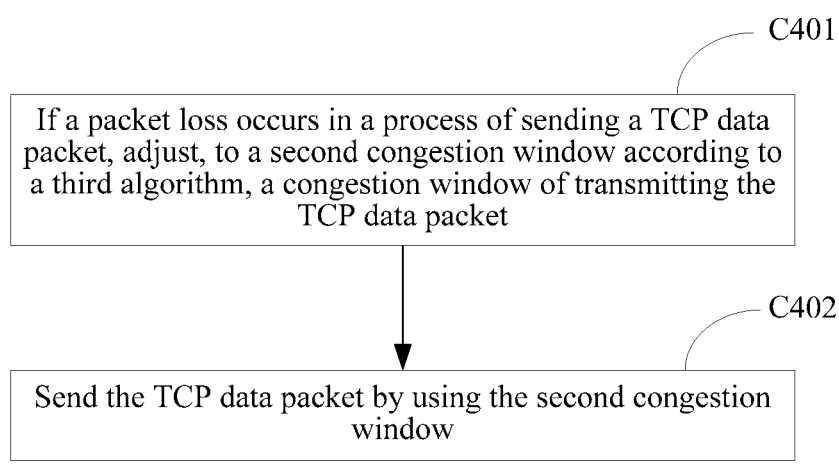
FIG. 4 is an optional optimized flowchart based on the method for sending a Transmission Control Protocol (TCP) data packet shown in FIG. 2.

FIG. 4 shows an optional working procedure based on the TCP-based method for sending a TCP data packet shown in FIG. 2. However, for ease of description, FIG. 4 shows only parts related to this embodiment.

In an embodiment of the present invention, based on the foregoing embodiment and embodiment of the present invention, optional details are provided for adjustment of a congestion window when a packet loss occurs in a process of sending the TCP data packet in the network. The method further includes step C401 and step C402.

Step C401: If a packet loss occurs in a process of sending the TCP data packet, adjust, to a second congestion window according to a third algorithm, a congestion window of transmitting the TCP data packet, where the second congestion window is determined according to a third round-trip time that exists when the packet loss occurs on the TCP data packet, and a decrease step size of adjusting, to the second congestion window, the congestion window of transmitting the TCP data packet is negatively correlated with the third round-trip time.

Specifically, for a method for recognizing a loss of a TCP data packet, reference is made to the corresponding description in the foregoing step B301. For example, a server sends multiple TCP data packets to a terminal sequentially, the TCP data packets reach the terminal in a random time order, and the terminal has received multiple TCP data packets that are arranged in the end (for example, three TCP data packets that are arranged in the end), but still does not receive a TCP data packet that is arranged in the front. In this case, each time receiving each TCP data packet that is arranged in the end, the terminal sends, to the server, an acknowledgment (ACK) requesting a TCP data packet that is arranged in the front. After the server continuously receives the acknowledgment several times (for example, three times), the server determines that the TCP data packet that is arranged in the front is lost. It should be noted that, in this embodiment, after the server sends a TCP data packet, if an acknowledgment of the TCP data packet is still not received from the terminal after an RTO (which belongs to the foregoing preset time), it is determined that the TCP data packet is lost.

In this embodiment, after a loss of the TCP data packet occurs, an RTT that exists when the TCP data packet is lost is detected, and the RTT detected when the TCP data packet is lost is used as the third round-trip time. Therefore, the third round-trip time reflects a network state that exists when the TCP data packet is lost. It should be noted that, if the TCP data packet is randomly lost, the detected third round-trip time is equal to an RTT that exists when the network has light load.

When a sent data packet is lost in step C401, the second congestion window is determined based on the third round-trip time and according to the third algorithm. It should be noted that, the second congestion window determined in the third algorithm is negatively correlated with the third round-trip time. Specifically, the third round-trip time is used as as input of the third algorithm. As the third round-trip time increases, the second congestion window determined according to the third algorithm decreases. On the basis that the third algorithm has the foregoing functions, neither a specific implementation form nor steps of the third algorithm are limited in this embodiment. For example, an amplitude that a congestion window needs to be reduced when a loss of a TCP data packet occurs may be determined according to a requirement of a service, so as to design the third algorithm. For another example, an existing algorithm (for example, a Reno algorithm or a CUBIC algorithm) may be used as the third algorithm.

Optionally, in step C401, the adjusting, to a second congestion window according to a third algorithm, a congestion window of transmitting the TCP data packet specifically includes:

if the third round-trip time is equal to a lower limit of a delay interval, using a congestion window that exists when the packet loss occurs on the TCP data packet as the second congestion window; or if the third round-trip time is equal to an upper limit of the delay interval, using a preset congestion window as the second congestion window, where the upper limit of the delay interval is a retransmission timeout (RTO) of the TCP in the network, the lower limit of the delay interval is a round-trip time that exists when the network has light load, and the preset congestion window refers to a congestion window preset by a user.

Specifically, for a TCP flow carrying a service, one RTO is defined for the TCP flow in the TCP protocol. Optionally, the RTO may be manually modified, or the RTO is set according to experimental data of a current network. In this embodiment, the RTO is determined as an upper limit of the delay interval. After the server sends, to the terminal, a TCP data packet carrying the service, if the server still does not receive an acknowledgment of the TCP data packet from the terminal after the specific time, it is also determined that a packet loss occurs.

In addition, the round-trip time that exists when the network has light load refers to an RTT, of a TCP data packet carrying a service, that is calculated when an acknowledgment of the TCP data packet is received from the terminal after the server sends the TCP data packet to the terminal in a case in which the network does not have network congestion (that is, in a light network load). Optionally, in specific implementation, when the network is in light network load, the server sends, to the terminal, TCP data packets carrying the service, detects an RTT of each TCP data packet, and selects a minimum RTT of the detected RTTs. In this embodiment, a lower limit of the delay interval is determined as the selected minimum RTT of the detected RTTs.

A loss of a TCP data packet occurs in a process in which the server controls sending of a TCP data packet, carrying the service, to the terminal by using the congestion window of the TCP. If the third round-trip time that exists when the loss of the TCP data packet occurs is equal to the lower limit of the delay interval, it indicates that the network state is desirable, and the loss of the TCP data packet is only occasional (for example, a random packet loss). In this case, the congestion window that exists when the TCP data packet is lost is not reduced, that is, the congestion window that exists when the TCP data packet is lost is used as the second congestion window, and the lost TCP data packet only needs to be sent again. In this way, when the network state is desirable, if a packet loss occurs only occasionally (for example, a random packet loss), the congestion window does not need to be reduced. Compared with the prior art in which a congestion window is greatly reduced once a loss of a TCP data packet is detected, in this embodiment, a network bandwidth can be utilized more effectively, and a service is supported as much as possible.

A loss of a TCP data packet occurs in a process in which the server controls sending of a TCP data packet, carrying the service, to the terminal by using the congestion window of the TCP. If it is detected that the third round-trip time that exists when the loss of the TCP data packet occurs is equal to the upper limit of the delay interval, that is, the third round-trip time is equal to the RTO, it indicates that the network has severe congestion. In this case, the congestion window needs to be reduced. The congestion window that exists when the TCP data packet is lost is reduced to the preset congestion window. It should be noted that, when the third round-trip time reaches the RTO, it is determined that the TCP data packet is lost, and detection of the third round-trip time of the TCP data packet terminates. Therefore, the third round-trip time can at most be the RTO.

Optionally, if the third round-trip time falls between the lower limit and the upper limit of the delay interval, it is determined, according to the third algorithm, that the second congestion window is greater than the preset congestion window and is less than the congestion window that exists when the TCP data packet is lost. As the third round-trip time increases, the second congestion window determined according to the third algorithm decreases.

Step C402: Send the TCP data packet by using the second congestion window.

Specifically, in the TCP flow of the service, if the loss of the TCP data packet occurs, the second congestion window is determined in step C401, and in step C402, the second congestion window is used to replace the congestion window that exists when the TCP data packet is lost, so that updating and replacement of a congestion window are performed, and the second congestion window is then used to control sending of the TCP data packet of the service.

In an embodiment of the present invention, based on the foregoing embodiment and embodiment of the present invention, to further provide optional details of the second algorithm, the increase step size of the congestion window determined in the second algorithm is positively correlated with the target throughput and is negatively correlated with the first round-trip time, and the increase step size of the congestion window determined in the first algorithm is negatively correlated with the first round-trip time.

Specifically, if the first round-trip time that reflects the network state is shorter than or equal to the second round-trip time, it indicates that network congestion does not occur in the network and the network bandwidth that exists when a TCP data packet is lost can meet the target throughput, and the congestion window may be increased according to the second algorithm. Specifically, when the first congestion window is determined according to the second algorithm, as the target throughput increases, the first congestion window determined according to the second algorithm also increases. As the first round-trip time increases, the first congestion window determined according to the second algorithm decreases. Optionally, if the first round-trip time is shorter than or equal to the second round-trip time, it indicates that network congestion does not occur, and the target throughput that exists when the first congestion window is determined according to the second algorithm has a weight greater than that of the first round-trip time. When the server sends the TCP data packet, carrying the service, to the terminal by using the determined first congestion window, the target throughput can be reached. Therefore, a bit rate, which is obtained by the terminal by parsing the TCP data packet, of the service meets a bit rate needed by the service, and the server can provide the service for the terminal normally.

If the first round-trip time that reflects the network state is longer than the second round-trip time, it indicates that the network bandwidth that exists when the TCP data packet is lost can no longer meet the target throughput, and network congestion occurs in the network. In this case, the first congestion window is determined by using the first algorithm. When the first congestion window is determined according to the first round-trip time in the first algorithm, as the first round-trip time increases, the first congestion window determined according to the first algorithm decreases. When the server controls, by using the first congestion window determined according to the first algorithm, a TCP data packet sent to the terminal, a throughput provided by the first congestion window determined according to the first algorithm cannot reach the target throughput, and a difference from the target throughput can only be minimized. Therefore, a bit rate, which is obtained by the terminal by parsing the TCP data packet, of the service cannot meet a bit rate needed by the service; however, the service can be supported to the maximum in a current network state, the difference from the target throughput is reduced, and the server is supported as much as possible to provide the service for the terminal.

In an embodiment of the present invention, based on the foregoing embodiment and embodiment of the present invention, to further provide optional details of the second algorithm, the using the congestion window determined according to the first algorithm as a first congestion window specifically includes:

if the first round-trip time is equal to the round-trip time that exists when the network has light load, using a fast recovery value as a value of the increase step size of the congestion window, to obtain the first congestion window, where the fast recovery value has an order of magnitude same as that of a slow start;

if the first round-trip time is equal to a retransmission timeout (RTO) of the TCP in the network, using one maximum segment size (MSS) as a value of the increase step size of the congestion window, to obtain the first congestion window; or if the first round-trip time changes within an interval between the round-trip time that exists when the network has light load and a retransmission timeout (RTO) of the TCP in the network, setting a value of the increase step size of the congestion window to be between one MSS and the fast recovery value and be negatively correlated with the first round-trip time, to obtain the first congestion window.

Specifically, a slow start threshold (ssthresh) is preset for a congestion window. If the first round-trip time is equal to the round-trip time that exists when the network has light load, it indicates that the network state is desirable. In this case, if it is detected that the congestion window of the first round-trip time is shorter than the slow start threshold, when an increase step size of the congestion window is determined according to the first algorithm, the fast recovery value (the increase step size determined according to the first algorithm) determined according to the first algorithm and an increase step size determined according to a slow start algorithm belong to a same order of magnitude, and the detected congestion window of the first round-trip time is used to increase the fast recovery value to obtain the first congestion window. It should be noted that, in this embodiment, neither the slow start nor the corresponding slow start algorithm is limited, and an existing slow start and corresponding slow start algorithm can be used for implementation.

If the detected first round-trip time has reached the RTO, it indicates that severe congestion has occurred in the current network state reflected by the first round-trip time. In this case, in the first algorithm, the value of the increase step size of the congestion window is one MSS. In such a case, even if TCP data packets of a congestion window in a round are successfully sent, the current congestion window is increased by only one MSS to obtain the first congestion window, and the first congestion window is used to update and replace the current congestion window.

If the detected first round-trip time falls within an interval between the round-trip time that exists when the network has light load and the retransmission timeout (RTO) of the TCP in the network, in the first algorithm, the value of the increase step size of the congestion window is correspondingly set to be between one MSS and the fast recovery value; however, the increase step size determined according to the first algorithm is negatively correlated with the first round-trip time. In such a case, even if TCP data packets of a congestion window in a round are successfully sent, the increase step size is increased for a current congestion window, to obtain the first congestion window.

In an embodiment of the present invention, based on the foregoing embodiment and embodiment of the present invention, to further provide optional details of the second algorithm, the using the congestion window determined according to the second algorithm as the first congestion window specifically includes:

calculating a target window according to the target throughput and the first round-trip time, and using a difference between the target window and a current congestion window of the TCP in the network as the value of the increase step size of the congestion window, to determine the first congestion window.

Specifically, if the first round-trip time is shorter than or equal to the second round-trip time, it indicates that the network state reflected by the first round-trip time is desirable, the network bandwidth is greater than or equal to the target throughput, and the congestion window may be increased to improve the throughput provided for the service. To increase at one go the current congestion window to a target window that can provide the target throughput in a current network state, the value of the increase step size of the congestion window is set to the difference between the target window and the current congestion window of the TCP in the network. In this way, the first congestion window that is obtained by increasing, by the increase step size, the congestion window that exists during detection of the first round-trip time is directly equal to the target window. Therefore, the target window that meets the target throughput of the service as much as possible can be directly used in the current network state to control sending of the TCP data packet, thereby providing the service as much as possible.

In an embodiment of the present invention, based on the foregoing embodiment and embodiment of the present invention, to further provide optional details, the target throughput is determined according to a bit rate, which is obtained by parsing a packet in the TCP data packet, of the service.

Specifically, FIG. 1B is used as an example. In a process in which the server provides a service for the terminal, the server may obtain, by means of parsing, a bit rate separately needed by the server to provide each service for the terminal, and a target throughput separately needed by the server to provide each service for the terminal is calculated according to the bit rate that is obtained by means of parsing. A specific implementation manner of parsing is not limited in this embodiment of the present invention. For example, each service generally has a corresponding standard bit rate, and a target throughput required for sending a TCP data packet carrying the service is correspondingly determined according to the bit rate, where a value of the target throughput corresponding to the service is greater than a value of the bit rate of the service. In this way, when the server provides the service for the terminal by using the target throughput, the bit rate that is obtained by the terminal by parsing the TCP data packet meets the bit rate needed by the service, that is, the bit rate, obtained by the terminal by means of parsing, of the service is greater than or equal to the standard bit rate corresponding to the service.

Optionally, an algorithm of determining the target throughput according to the bit rate, which is obtained by parsing the packet in the TCP data packet, of the service is: the target throughput is equal to a product of the bit rate of the service and an expansion coefficient, where the expansion coefficient is greater than 1.

Figure 5:
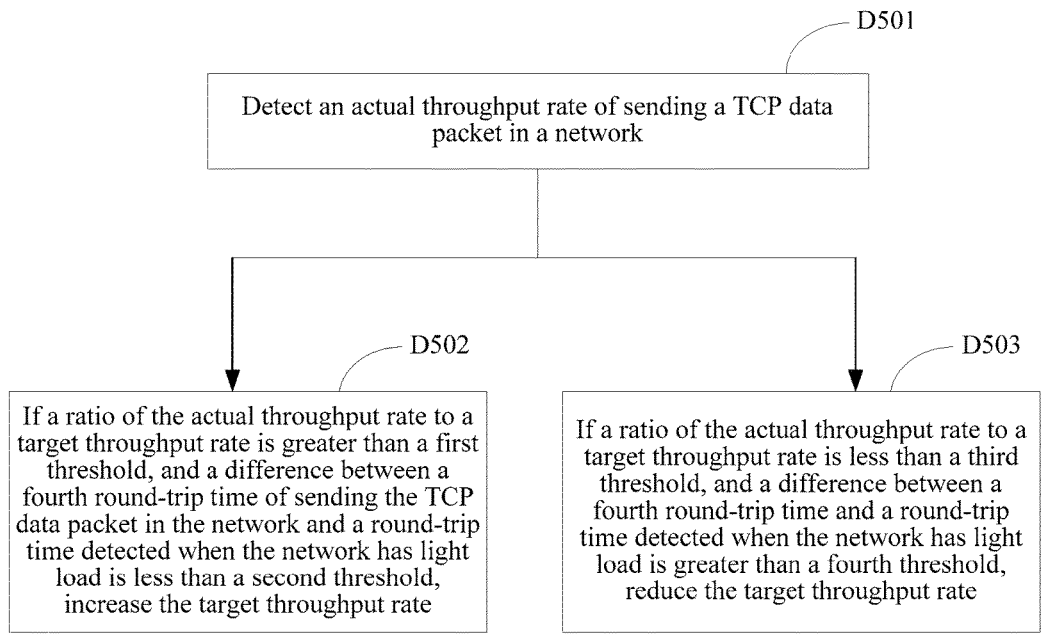
FIG. 5 is a flowchart of updating a target throughput in a method for sending a Transmission Control Protocol (TCP) data packet.

FIG. 5 shows a working procedure for updating a target throughput. However, for ease of description, FIG. 5 shows only parts related to this embodiment.

In an embodiment of the present invention, based on the foregoing embodiment and embodiment of the present invention, optional details are further provided from the perspective of updating a target throughput according to a current network state. Referring to FIG. 5, the method further includes step D501, step D502, and step D503.

Step D501: Detect an actual throughput of sending the TCP data packet in the network.

Step D502: If a ratio of the actual throughput to the target throughput is greater than a first threshold, and a difference between a fourth round-trip time of sending the TCP data packet in the network and a round-trip time detected when the network has light load is less than a second threshold, increase the target throughput.

Step D503: If a ratio of the actual throughput to the target throughput is less than a third threshold, and a difference between a fourth round-trip time and a round-trip time detected when the network has light load is greater than a fourth threshold, reduce the target throughput.

It should be noted that the third threshold is less than the first threshold, and the second threshold is less than the fourth threshold.

Specifically, in a process of sending a TCP data packet of the service in the network, a congestion window of a TCP flow corresponding to the service may be adjusted according to the target throughput, so that when the adjusted congestion window is used to send the TCP data packet of the service, the target throughput needed by the service can be met as much as possible. However, in the foregoing embodiment, a bit rate of the service is the only parameter introduced during determining of the target throughput, and a factor of the network state is not considered. In this embodiment, during determining of a target throughput, both the bit rate of the service and the current network state are considered.

Specifically, in a process of sending the TCP data packet in the network, a current RTT of sending a TCP data packet is detected, and the detected current RTT is used as the fourth round-trip time. A current throughput of sending the TCP data packet in the network is detected. The detected current throughput is the actual throughput. Factors determining the actual throughput include a network state, a throughput of a transmit end, and a throughput of a receive end. Using the system shown in FIG. 1A as an example, factors determining the actual throughput include a network state of the network 103, a throughput of the server 101, and a throughput of the terminal 102. Using the system shown in FIG. 1B as an example, factors determining the actual throughput include a network state of the network 203, a throughput of the first agent device 204, and a throughput of the terminal 202. Using the system shown in FIG. 1C as an example, factors determining the actual throughput include a network state of the network 303, a throughput of the first agent device 304, and a throughput of the second agent device 305. It should be further noted that in this embodiment, a frequency and a quantity of times of simultaneously detecting the fourth round-trip time and the actual throughput are not limited. For example, the fourth round-trip time and the actual throughput may be simultaneously detected once at an interval of a particular time.

A ratio of the actual throughput to the target throughput is calculated, and a difference between the fourth round-trip time and a reference round-trip time (that is, an RTT detected when the TCP data packet is sent in a case in which the network is in a network state of light network load) is calculated.

If the ratio is greater than the first threshold, and the difference is less than a second threshold, it indicates that the network state is desirable, and a physical bandwidth of the network is greater than the target throughput. Step D502 may be performed to increase the target throughput, and an assigned value of the target throughput is updated in the TCP protocol stack. Optionally, the first threshold is a value that approximates 1. For example, the first threshold is 90%. Optionally, the second threshold is a value that approximates 0. Optionally, when it is ensured that the target throughput increased after step D502 is performed is less than the network bandwidth, a step length size of increasing the target throughput in step D502 is not limited.

If the ratio is less than the third threshold, and the difference is greater than the fourth threshold, it indicates that the network state is poor, and a physical bandwidth of the network is less than the target throughput. Step D503 may be performed to reduce the target throughput, and an assigned value of the target throughput is updated in the TCP protocol stack. Optionally, the third threshold is less than or equal to 50%. For example, the first threshold is 20%. Optionally, the second threshold is a relatively large delay value. Optionally, when it is ensured that the target throughput reduced after step D502 is performed is less than the network bandwidth, a step length size of reducing the target throughput in step D503 is not limited.

In this embodiment, on the basis of determining, according to the bit rate needed by the service, the target throughput required for sending the TCP data packet of the service, a current network state is further considered. A value of a target throughput in a protocol stack is adjusted in real time according to the current network state. Therefore, a probability that a TCP data packet is lost is increased because of a congestion window determined according to an excessively large target throughput can be avoided, and a congestion window can be increased by increasing an excessively small target throughput, thereby effectively utilizing a physical bandwidth of a network.

In an embodiment of the present invention, based on the foregoing embodiment and embodiment of the present invention, in an optional implementation manner, the target throughput is transferred to a TCP protocol stack by using a target throughput parameter. Specifically, for the system provided based on FIG. 1A, a target throughput parameter is added to a TCP protocol stack of the server 101 in FIG. 1A, and the target throughput is used to assign a value of the target throughput parameter. For the system provided in FIG. 1B, a target throughput parameter is added to a TCP protocol stack of the first proxy server 204, and the target throughput is used to assign a value of the target throughput parameter. For the system provided in FIG. 1C, a target throughput parameter is added to a TCP protocol stack of the first proxy server 304, and the target throughput is used to assign a value of the target throughput parameter.

It should be noted that, the foregoing embodiment and embodiment of the invention are all described by using the system provided based on FIG. 1A as an example, where the foregoing embodiment and embodiment of the invention are applicable to the server 101 in FIG. 1A. It should be noted that for the system provided in FIG. 1B, the foregoing embodiment and embodiment of the invention are applicable to the first proxy server 204. It should be noted that, for the system provided in FIG. 1C, the foregoing embodiment and embodiment of the invention are applicable to the first proxy server 304.

In an embodiment of the present invention, this embodiment further provides optional details for the foregoing embodiment and embodiment of the invention on the basis of application of the method to the server 101 in FIG. 1A. The method includes:

A server obtains a bit rate of the service by parsing a packet in the TCP data packet, and multiplies the bit rate by an expansion coefficient to obtain the target throughput.

Specifically, in a process in which the server provides a service for the terminal, for a TCP data packet that carries the service and that is sent by the server to the terminal, the server determines a field in a packet included in the TCP data packet, and records, in the field, a bit rate needed by the service. If the service that is obtained by the terminal by parsing the TCP data packet can meet the bit rate needed by the service, it indicates that the server normally and successfully provides the service for the terminal.

It should be noted that the service is added to the packet included in the TCP data packet, and specifically, data related to the service is added to the packet. Therefore, in terms of numerical values, a value of the target throughput calculated according to the third algorithm is greater than a value of the bit rate needed by the service.

In an embodiment of the present invention, if the server 101 in FIG. 1A does not support modification of a TCP protocol stack of the server 101 (it is included that the server 101 does not support addition of the target throughput to the TCP protocol stack), in FIG. 1B, the first agent device 204 is used as an agent of the server 201, and the first agent device 204 supports modification of a TCP protocol stack of the first agent device 204 (it is included that the first agent device 204 supports addition of the target throughput to the TCP protocol stack). As shown in FIG. 1B, the first agent device 204 is added in the network, and the first agent device 204 acts as an agent of the server 201 to send, to the terminal 202, a TCP data packet carrying the service. In this case, in FIG. 1B, the foregoing embodiment and embodiment of the invention that are described based on an example in which the method is applied to the server 101 in FIG. 1A are no longer applied to the server 201 in FIG. 1B, but instead, are applied to the first agent device 204 in FIG. 1B.

When the foregoing embodiment and embodiment of the invention that are described by using an example in which the method is applied to the server 101 in FIG. 1A are applied to the first agent device 204 in FIG. 1B, there is a difference that the terminal 202 calculates the target throughput. After the server in other steps is replaced with the first agent device 204, the foregoing embodiment and embodiment of the invention can be applied to the first agent device 204. The difference is specifically described in detail as follows:

The method for sending a TCP data packet provided in the foregoing embodiment and implementation manners of the invention is applied to a first agent device. The first agent device acts as an agent of the server to send a TCP data packet to a terminal. The target throughput is determined by the terminal. A determining method includes: obtaining a bit rate of the service by parsing a packet in the TCP data packet, and multiplying the bit rate by an expansion coefficient to obtain the target throughput. The first agent device obtains the target throughput from the terminal.

Specifically, the server has a TCP protocol stack that does not support to be modified, the first agent device has a TCP protocol stack that supports to be modified, and the terminal has a TCP protocol stack. The server may generate, according to the TCP protocol stack of the server, a TCP data packet carrying the service, and the TCP data packet is exchanged between the server and the first agent device based on the TCP/IP protocol. For the TCP data packet that carries the service and that is received by the first agent device from the server, the first agent device modifies the TCP data packet based on the TCP protocol stack of the first agent device (the service carried in the packet included in the TCP data packet may not be modified), and sends the modified TCP data packet to the terminal. The terminal parses the TCP data packet based on the TCP protocol stack of the terminal, parses out the packet carrying the service, and obtains data related to the service by parsing the packet.

The packet further records the bit rate needed by the service. After obtaining the packet by parsing the TCP data packet, the terminal may parse the packet to obtain the bit rate needed by the service, and multiply the bit rate by an expansion coefficient to obtain the target throughput.

Subsequently, the terminal modifies a socket of the TCP, adds a parameter, that is, a target throughput parameter, assigns a value of the target throughput parameter by using the target throughput, and transmits, to the TCP protocol stack of the terminal by using the socket, the target throughput parameter and the assigned value (the target throughput) of the target throughput parameter. For example, the target throughput parameter "target_throughput" is added to the socket function "setsockopt ( )". After the target throughput is calculated according to the bit rate and the expansion coefficient, the calculated target throughput is used to assign a value of the "target_throughput". The "target_throughput" and the assigned value of the "target_throughput" are transmitted to the TCP protocol stack of the terminal by using the "setsockopt ( )".

The terminal generates a packet, extends a TCP option of the packet, and adds a target throughput parameter and an assigned value of the target throughput parameter (a target throughput parameter transmitted to the TCP protocol stack by using the socket and an assigned value of the target throughput parameter) to the TCP option. The terminal sends a TCP data packet (the TCP data packet includes the packet having the TCP option that has the target throughput rate parameter and the assigned value of the target throughput rate parameter) to the first agent device. The first agent device may parse the TCP data packet, to obtain the target throughput parameter and the assigned value of the target throughput parameter that are included in the TCP option of the packet. Further, the first proxy server may add the target throughput parameter and the assigned value of the target throughput parameter to the TCP protocol stack of the first proxy server.

Optionally, if the TCP protocol stack of the terminal supports to be modified, in this embodiment, after the target throughput parameter and the assigned value of the target throughput parameter are received by using the socket, "the target throughput parameter and the assigned value of the target throughput parameter" are added to the TCP protocol stack of the terminal. Certainly, even if the target throughput parameter and the assigned value of the target throughput parameter are received by using the socket, in this embodiment, the target throughput parameter and the assigned value of the target throughput parameter may not be added to the TCP protocol stack of the terminal, but instead a packet (the target throughput parameter and the assigned value of the target throughput parameter are added to a TCP option of the packet) is directly generated. The terminal sends, to the first agent device, a TCP data packet carrying the packet, to enable the first agent device to add the target throughput parameter and the assigned value of the target throughput parameter to the TCP protocol stack of the first agent device.

In an embodiment of the present invention, the foregoing embodiment and embodiment of the invention that are described based on an example in which the method is applied to the server 101 in FIG. 1A are optionally optimized. If the server 101 in FIG. 1A does not support modification of a TCP protocol stack of the server 101 (it is included that the server 101 does not support addition of the target throughput to the TCP protocol stack), in FIG. 1C, the first agent device 304 acts as an agent of the server 101. The first agent device 304 supports modification of a TCP protocol stack of the first agent device 304 (it is included that the first agent device 304 supports addition of the target throughput to the TCP protocol stack). In addition, the second agent device 305 may be further added in the network. As shown in FIG. 1C, the second agent device 305 acts as an agent of the terminal 302 to exchange the TCP data packet with the first agent device 304. One reason for adding the second agent device 305 is that a TCP protocol stack is shared between the first agent device 304 and the second agent device 305, including that the second agent device 305 sends, by using the method for sending a TCP data packet, a packet carrying a target throughput parameter and an assigned value of the target throughput parameter to the first agent device 304. Another reason for adding the second agent device 305 is that a same second agent device 305 acts as an agent of multiple terminals 302, and the second agent device 305 acts as an agent of each terminal 302 to exchange the TCP data packet with the first agent device 304.

In this case, in FIG. 1C, the foregoing embodiment and embodiment of the invention that are described based on an example in which the method is applied to the server 101 in FIG. 1A are no longer applied to the server 101 in FIG. 1A, but instead, are applied to the first agent device 304 in FIG. 1C. When the foregoing embodiment and embodiment of the invention that are described by using an example in which the method is applied to the server 101 in FIG. 1A are applied to the first agent device 304 in FIG. 1C, there is a difference that the terminal 302 calculates a target throughput. After the server in other steps is replaced with the first agent device 304, the foregoing embodiment and embodiment of the invention may be applied to the first agent device 304. The difference is specifically described in detail as follows:

The method for sending a TCP data packet provided in the foregoing embodiment and implementation manners of the invention is applied to a first agent device. The first agent device acts as an agent of the server to send a TCP data packet to a second agent device, so that the second agent device forwards the TCP data packet to a terminal. Subsequently, the terminal determines a target throughput and sends the target throughput to the second agent device. A method for determining the target throughput includes: parsing a packet in the TCP data packet to obtain a bit rate of the service, and multiplying the bit rate by an expansion coefficient to obtain the target throughput. Further, the first agent device obtains the target throughput from the second agent device.

Specifically, the server has a TCP protocol stack that does not support to be modified, the first agent device has a TCP protocol stack that supports to be modified, the second agent device has a TCP protocol stack, and the terminal has a TCP protocol stack. The server may generate, according to the TCP protocol stack of the server, a TCP data packet carrying the service, and the TCP data packet is exchanged between the server and the first agent device based on the TCP/IP protocol. For the TCP data packet that carries the service and that is received by the first agent device from the server, the first agent device modifies the TCP data packet based on the TCP protocol stack of the first agent device (the service carried in the packet included in the TCP data packet may not be modified), and sends the modified TCP data packet to the second agent device. The second agent device modifies the TCP data packet again based on the TCP protocol stack of the second agent device, and sends the TCP data packet that is modified again to the terminal. The terminal parses the TCP data packet that is modified again, parses out the packet carrying the service, and then obtains data related to the service by parsing the packet.

The packet further records the bit rate needed by the service. After obtaining the packet by parsing the TCP data packet, the terminal may parse the packet to obtain the bit rate needed by the service, and multiply the bit rate by an expansion coefficient to obtain the target throughput.

Subsequently, the terminal modifies a socket of the TCP, adds a parameter, that is, a target throughput parameter, assigns a value of the target throughput parameter by using the target throughput that is calculated according to the bit rate needed by the service, and transmits, to the TCP protocol stack of the terminal by using the socket, the target throughput parameter and the assigned value (the target throughput) of the target throughput parameter. For example, the target throughput parameter "target_throughput" is added to the socket function "setsockopt ( )". After the terminal calculates the target throughput according to a throughput needed by the service, the calculated target throughput is used to assign a value of the "target_throughput". The "target_throughput" and the assigned value of the "target_throughput" are transmitted to the TCP protocol stack of the terminal by using the "setsockopt ( )".

The terminal generates a first packet, extends a TCP option of the first packet, and adds a target throughput parameter and an assigned value of the target throughput parameter (a target throughput parameter transmitted to the TCP protocol stack by using the socket and an assigned value of the target throughput parameter) to the TCP option. The terminal sends a TCP data packet (the TCP data packet includes the first packet having the TCP option that has the target throughput rate parameter and the assigned value of the target throughput rate parameter) to the second agent device.

The second agent device may parse the TCP data packet, to obtain the target throughput parameter and the assigned value of the target throughput parameter that are included in the TCP option of the first packet. The second agent device generates a second packet, extends a TCP option of the second packet, and adds a target throughput parameter and an assigned value of the target throughput parameter (the target throughput parameter and the assigned value of the target throughput parameter that are in the first packet) to the TCP option. The second agent device sends a TCP data packet (the TCP data packet includes the second packet having the TCP option that has the target throughput rate parameter and the assigned value of the target throughput rate parameter) to the first agent device.

The first agent device parses the TCP data packet received from the second agent device to parse out the second packet, obtains the target throughput parameter and the assigned value of the target throughput parameter from the second packet, and adds the target throughput parameter and the assigned value of the target throughput parameter to the TCP protocol stack of the first agent device.

Optionally, after obtaining the target throughput parameter and the assigned value of the target throughput parameter from the first packet, the second agent device may add the target throughput parameter and the assigned value of the target throughput parameter to the TCP protocol stack of the second agent device. Certainly, after the second agent device obtains the target throughput parameter and the assigned value of the target throughput parameter from the first packet, in this embodiment, the TCP protocol stack of the second agent device may not be modified (that is, the target throughput parameter and the assigned value of the target throughput parameter are added to the TCP protocol stack of the second agent device), but instead the second packet (the target throughput parameter and the assigned value of the target throughput parameter are added to the TCP option of the second packet) is directly generated. The second agent device sends, to the first agent device, the TCP data packet carrying the packet, to enable the first agent device to add the target throughput parameter and the assigned value of the target throughput parameter to the TCP protocol stack of the first agent device.

It should be noted that, the second agent device is added. Because the first agent device and the second agent device have fixed routing paths, when the network has light load, an RTT of the TCP data packet from the first agent device to the second agent device is basically unchanged. Therefore, when the second agent device acts as agents of one or more terminals, after an RTT of an existing TCP flow between the second agent device and the first agent device is already determined when the network has light load, a lower limit of a delay interval corresponding to the existing TCP flow (the RTT of the existing TCP flow that exists when the network has light load) is determined. If a TCP flow of a service is newly added between the second agent device and the first agent device, it is not required to select, among RTTs of a congestion window in a round, a minimum RTT of the RTTs of the congestion window in the round as a lower limit of a delay interval corresponding to the newly added TCP flow, but instead, the lower limit of the delay interval corresponding to the existing TCP flow is directly used as a lower limit of a delay interval corresponding to the newly added TCP flow of the service. That is, the RTT of the existing TCP flow that exists when the network has light load is directly used as an RTT of the newly added TCP flow of the service that exists when the network has light load.

In an embodiment of the present invention, based on the foregoing embodiment and embodiment of the invention, regardless of whether the method is applied to the server 101 in FIG. 1A, the first agent device 204 in FIG. 1B, or the first agent device 304 in FIG. 1C, the target throughput is calculated based on a bit rate of a service (the bit rate is multiplied by an expansion coefficient to obtain the target throughput), and in this embodiment, the service is detailed as follows:

if the service is an audio service, a bit rate of the service is an audio bit rate of the audio service;

if the service is a video service, a bit rate of the service is a video bit rate of the video service; or if the service is an audio and video service, a bit rate of the service is an audio and video bit rate of the audio and video service.

Specifically, when providing a service for the terminal, the server generates a packet carrying the service. At the same time, a field is determined in the packet, and a bit rate needed by the service is recorded in the field. If the service is an audio service, an audio bit rate needed by the audio service is recorded in the field of the packet. If the service is a video service, a video bit rate needed by the video service is recorded in the field of the packet. If the service is an audio and video service, an audio and video bit rate needed by the audio and video service is recorded in the field of the packet.

Figure 6:
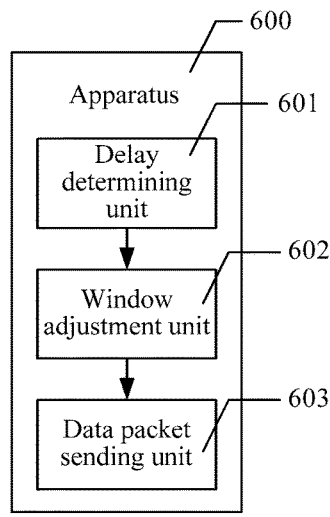
FIG. 6 is a schematic diagram of a logical structure of an apparatus 600 for sending a Transmission Control Protocol (TCP) data packet.

In an embodiment of the present invention, FIG. 6 is a schematic diagram of a logical structure of an apparatus 600 for sending a Transmission Control Protocol (TCP) data packet according to an embodiment of the present invention. As shown in FIG. 6, the apparatus 600 includes at least: a delay determining unit 601, a window adjustment unit 602, and a data packet sending unit 603.

The delay determining unit 601 is configured to: obtain a first round-trip time of sending a TCP data packet in a network, and determine a second round-trip time, where the second round-trip time is a round-trip time that exists when a congestion window that is determined according to a first algorithm and a congestion window that is determined according to a second algorithm have an equal size, where in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet.

The window adjustment unit 602 is configured to: if the first round-trip time is longer than the second round-trip time, use the congestion window determined according to the first algorithm as a first congestion window; or if the first round-trip time is shorter than or equal to the second round-trip time, use the congestion window determined according to the second algorithm as the first congestion window.

The data packet sending unit 603 is configured to send the TCP data packet by using the first congestion window.

Optionally, the increase step size of the congestion window determined in the second algorithm is positively correlated with the target throughput and is negatively correlated with the first round-trip time, and the increase step size of the congestion window determined in the first algorithm is negatively correlated with the first round-trip time.

Optionally, the target throughput is determined according to a bit rate, which is obtained by parsing a packet in the TCP data packet, of the service.

Optionally, an algorithm of determining the target throughput according to the bit rate, which is obtained by parsing the packet in the TCP data packet, of the service is: the target throughput is equal to a product of the bit rate of the service and an expansion coefficient, where the expansion coefficient is greater than 1.

Optionally, the window adjustment unit 602 is further configured to: if a packet loss occurs in a process of sending the TCP data packet, adjust, to a second congestion window according to a third algorithm, a congestion window of transmitting the TCP data packet, where the second congestion window is determined according to a third round-trip time that exists when the packet loss occurs on the TCP data packet, and a decrease step size of adjusting, to the second congestion window, the congestion window of transmitting the TCP data packet is negatively correlated with the third round-trip time; and the data packet sending unit 603 is further configured to send the TCP data packet by using the second congestion window.

Optionally, that the window adjustment unit 602 is further configured to adjust, to a second congestion window according to a third algorithm, a congestion window of transmitting the TCP data packet is specifically:

the window adjustment unit 602 is configured to: if the third round-trip time is equal to a lower limit of a delay interval, use a congestion window that exists when the packet loss occurs on the TCP data packet as the second congestion window; or if the third round-trip time is equal to an upper limit of the delay interval, use a preset congestion window as the second congestion window, where the upper limit of the delay interval is a retransmission timeout (RTO) of the TCP in the network, and the lower limit of the delay interval is a round-trip time that exists when the network has light load.

Optionally, that the window adjustment unit 602 is configured to use the congestion window determined according to the first algorithm as a first congestion window specifically includes:

the window adjustment unit 602 is configured to: if the first round-trip time is equal to the round-trip time that exists when the network has light load, use a fast recovery value as a value of the increase step size of the congestion window, to obtain the first congestion window, where the fast recovery value has an order of magnitude same as that of a slow start;

the window adjustment unit 602 is configured to: if the first round-trip time is equal to a retransmission timeout (RTO) of the TCP in the network, use one maximum segment size (MSS) as a value of the increase step size of the congestion window, to obtain the first congestion window; or the window adjustment unit 602 is configured to: if the first round-trip time changes within an interval between the round-trip time that exists when the network has light load and a retransmission timeout (RTO) of the TCP in the network, set a value of the increase step size of the congestion window to be between one MSS and the fast recovery value and be negatively correlated with the first round-trip time, to obtain the first congestion window.

Optionally, that the window adjustment unit 602 is configured to use the congestion window determined according to the second algorithm as the first congestion window is specifically:

the window adjustment unit 602 is configured to: calculate a target window according to the target throughput and the first round-trip time, and use a difference between the target window and a current congestion window of the TCP in the network as the value of the increase step size of the congestion window, to determine the first congestion window.

Figure 7:
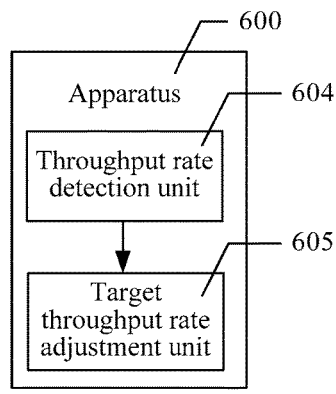
FIG. 7 is a schematic diagram of an optimized logical structure based on the apparatus 600 for sending a Transmission Control Protocol (TCP) data packet shown in FIG. 6.

Optionally, the apparatus is optimized from the perspective of updating a target throughput according to a network state. Referring to FIG. 7, the apparatus further includes a throughput detection unit 604 and a target throughput adjustment unit 605.

The throughput detection unit 604 is configured to detect an actual throughput of sending the TCP data packet in the network.

The target throughput adjustment unit 605 is configured to: if a ratio of the actual throughput to the target throughput is greater than a first threshold, and a difference between a fourth round-trip time of sending the TCP data packet in the network and a round-trip time detected when the network has light load is less than a second threshold, increase the target throughput; or if a ratio of the actual throughput to the target throughput is less than a third threshold, and a difference between a fourth round-trip time and a round-trip time detected when the network has light load is greater than a fourth threshold, reduce the target throughput.

Optionally, the target throughput is transferred to a TCP protocol stack by using a target throughput parameter.

Figure 8:
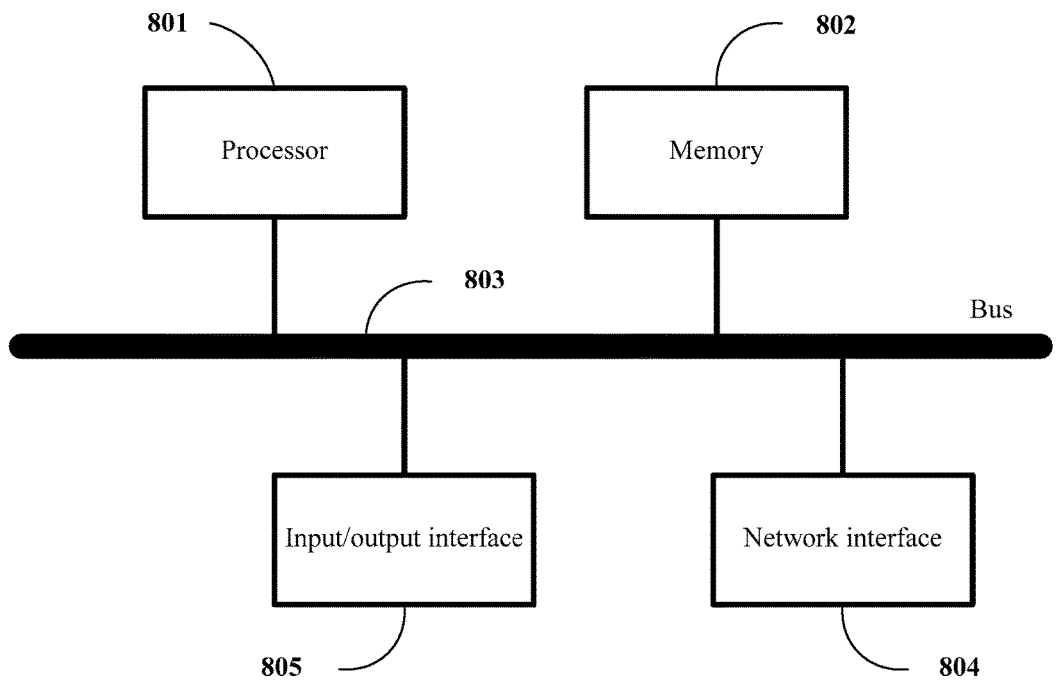
FIG. 8 is a schematic diagram of a hardware structure of an apparatus 800 for sending a Transmission Control Protocol (TCP) data packet according to an embodiment of the present invention.

In an embodiment of the present invention, FIG. 8 is a schematic diagram of a hardware structure of an apparatus 800 for sending a Transmission Control Protocol (TCP) data packet according to this embodiment, and shows a hardware structure of the sending apparatus 800. As shown in FIG. 8, the sending apparatus 800 includes a processor 801, a memory 802, and a network interface 804. The processor 801 is connected both to the memory 802 and the network interface 804 by using the bus 803. The sending apparatus 800 is connected to the network 103 by using the network interface 804 to send/receive the TCP data packet.

The memory 802 is configured to store a computer execution instruction. When the sending apparatus 800 runs, the processor 801 reads the computer execution instruction stored in the memory 802, to perform the method for sending a Transmission Control Protocol (TCP) data packet that is applied to the sending apparatus 800 and that is provided in the foregoing embodiment and embodiment of the invention.

The processor 801 may be a general-purpose central processing unit (CPU), a microprocessor, an application-specific integrated circuit (ASIC), or one or more integrated circuits, and is configured to execute a related program, so as to implement the technical solutions provided in the embodiments of the present invention. The technical solutions include the method for sending a Transmission Control Protocol (TCP) data packet provided in the foregoing embodiment and embodiment of the invention.

The memory 802 may be a read-only memory (ROM), a static storage device, a dynamic storage device, or a random access memory (RAM). The memory 802 may store an operating system and another application program. When the technical solutions provided in the embodiments of the present invention are implemented by using software or firmware, program code that is used to implement the technical solutions provided in the embodiments of the present invention is saved in the memory 802, including that program code of the method for sending a Transmission Control Protocol (TCP) data packet that is applied to the sending apparatus 800 and that is provided in the foregoing embodiment and embodiment of the invention is saved in the memory 802, and is executed by the processor 801.

The network interface 804 is used in a transceiver apparatus, which is, for example, but is not limited to, a transceiver, to implement network communication between the sending apparatus 800 and another device or a communications network. Optionally, the network interface 804 may be one of interfaces configured to connect to a network, for example, an Ethernet interface configured to connect to an Ethernet. The Ethernet interface includes, but is not limited to, an RJ-45 interface, an RJ-11 interface, an SC fiber interface, an FDDI interface, an AUI interface, a BNC interface, and a Console interface.

The bus 803 may include a path, used to transfer information between members (for example, the processor 801, the memory 802, and the network interface 804) of the sending apparatus 800.

Optionally, the sending apparatus 800 further includes an input/output interface 805. The input/output interface 805 is configured to: receive data and information that are input, and output data such as an operation result.

It should be noted that although only the processor 801, the memory 802, the network interface 804, and the bus 803 are shown in the sending apparatus 800 in FIG. 8, in a specific implementation process, persons skilled in the art should understand that the sending apparatus 800 further includes another device required for normal operation. Meanwhile, according to a specific requirement, persons skilled in the art should understand that the sending apparatus 800 may further include a hardware device that implements another additional function. In addition, persons skilled in the art should understand that the sending apparatus 800 may alternatively include only devices that are required to implement this embodiment of the present invention, but do not necessarily include all the devices shown in FIG. 8.

In an embodiment of the present invention, the system 100 is provided. Referring to FIG. 1A, the system 100 includes the server 101 and the terminal 102. The server 101 is in communication connection with the terminal 102 by using the network 103. The server 101 is the foregoing apparatus 800 for sending a Transmission Control Protocol (TCP) data packet, and sends a TCP data packet to the terminal 102 by using the network 103.

In an embodiment of the present invention, the system 200 is provided. Referring to FIG. 1B, the system 200 includes the server 201, the first agent device 204, and the terminal 202. The first agent device 204 is in communication connection both with the server 201 and the terminal 202. The server 201 is configured to send a TCP data packet to the terminal 202 by using the first agent device 204 as an agent.

The first agent device 204 is the foregoing apparatus 800 for sending a Transmission Control Protocol (TCP) data packet, and is configured to: receive the TCP data packet sent by the server 201 to the terminal 202, and act as an agent of the server 201 to send the TCP data packet to the terminal 202.

Optionally, the terminal 202 is configured to transfer a target throughput from a TCP protocol stack of the terminal 202 to a TCP protocol stack of the first agent device 204 by using a target throughput parameter.

In an embodiment of the present invention, the system 300 is provided. Referring to FIG. 1C, the system 300 includes the server 301, the first agent device 304, the second agent device 305, and the terminal 302. The first agent device 304 is in communication connection both with the server 301 and the second agent device 305. The server 301 is configured to send a TCP data packet to the terminal 302 by using the first agent device 304 as an agent.

The first agent device 304 is the foregoing apparatus 800 for sending a Transmission Control Protocol (TCP) data packet, and is configured to: receive the TCP data packet sent by the server 301 to the terminal 302, and act as an agent of the server 301 to send the TCP data packet to the second agent device 305.

The second agent device 305 is configured to: receive the TCP data packet and forward the TCP data packet to the terminal 302.

Optionally, the terminal 302 is configured to transfer a target throughput from a TCP protocol stack of the terminal 302 to a TCP protocol stack of the second agent device 305 by using a target throughput parameter.

The second agent device 305 is further configured to transfer the target throughput from the TCP protocol stack of the second agent device 305 to a TCP protocol stack of the first agent device 304 by using the target throughput parameter.

In the several embodiments provided in this application, it should be understood that the disclosed system, device, apparatus, and method may be implemented in other manners. For example, the described apparatus embodiment is merely used as an example. For example, the module and unit division is merely logical function division and may be other division during implementation. For example, a plurality of modules, units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module. The integrated module may be implemented in a form of hardware, or may be implemented in a form of hardware in addition to a software functional module.

The foregoing integrated module implemented in a form of a software functional module may be stored in a computer-readable storage medium. The software functional module is stored in a storage medium and includes several instructions for instructing a computer device (which may be a personal computer, a server, or a network device) to perform some steps of the methods described in the embodiments of the present invention. The foregoing storage medium includes: any medium that can store program code, such as a removable hard disk, a read-only memory (ROM), a random access memory (RAM), a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the protection scope of the technical solutions of the embodiments of the present invention.

What is claimed is:

1. A method for sending a Transmission Control Protocol (TCP) data packet, wherein the method comprises:
    obtaining a first round-trip time of sending a TCP data packet in a network;
    determining a second round-trip time, wherein the second round-trip time is a round-trip time that exists when a congestion window that is determined according to a first algorithm and a congestion window that is determined according to a second algorithm have an equal size, wherein in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet;
    using the congestion window determined according to the first algorithm as a first congestion window when the first round-trip time is longer than the second round-trip time;
    using the congestion window determined according to the second algorithm as the first congestion window when the first round-trip time is shorter than or equal to the second round-trip time; and
    sending the TCP data packet by using the first congestion window.

2. The method according to claim 1, wherein the increase step size of the congestion window determined in the second algorithm is positively correlated with the target throughput and is negatively correlated with the first round-trip time, and the increase step size of the congestion window determined in the first algorithm is negatively correlated with the first round-trip time.

3. The method according to claim 1, wherein the target throughput is determined according to a bit rate, which is obtained by parsing a packet in the TCP data packet, of the service.

4. The method according to claim 3, wherein the target throughput is equal to a product of the bit rate of the service and an expansion coefficient, wherein the expansion coefficient is greater than 1.

5. The method according to claim 1, wherein the method further comprises:
    adjusting, to a second congestion window according to a third algorithm, a congestion window of transmitting the TCP data packet, when a packet loss occurs in a process of sending the TCP data packet, wherein the second congestion window is determined according to a third round-trip time that exists when the packet loss occurs on the TCP data packet, and a decrease step size of adjusting, to the second congestion window, the congestion window of transmitting the TCP data packet is negatively correlated with the third round-trip time; and sending the TCP data packet by using the second congestion window.

6. The method according to claim 5, wherein the adjusting, to the second congestion window according to the third algorithm, the congestion window of transmitting the TCP data packet comprises:

using a congestion window that exists when the packet loss occurs on the TCP data packet as the second congestion window when the third round-trip time is equal to a lower limit of a delay interval; and using a preset congestion window as the second congestion window when the third round-trip time is equal to an upper limit of the delay interval, wherein the upper limit of the delay interval is a retransmission timeout (RTO) of the TCP in the network, and the lower limit of the delay interval is a round-trip time that exists when the network has light load.

7. The method according to claim 1, wherein the using the congestion window determined according to the first algorithm as the first congestion window comprises:

using a fast recovery value as a value of the increase step size of the congestion window, to obtain the first congestion window, when the first round-trip time is equal to the round-trip time that exists when the network has light load, wherein the fast recovery value has an order of magnitude same as that of a slow start;

using one maximum segment size (MSS) as a value of the increase step size of the congestion window, to obtain the first congestion window, when the first round-trip time is equal to a retransmission timeout (RTO) of the TCP in the network; and setting a value of the increase step size of the congestion window to be between one MSS and the fast recovery value and be negatively correlated with the first round-trip time, to obtain the first congestion window, when the first round-trip time changes within an interval between the round-trip time that exists when the network has light load and the RTO of the TCP in the network.

8. The method according to claim 1, wherein the using the congestion window determined according to the second algorithm as the first congestion window comprises:

calculating a target window according to the target throughput and the first round-trip time, and using a difference between the target window and a current congestion window of the TCP in the network as the value of the increase step size of the congestion window, to determine the first congestion window.

9. The method according to claim 1, wherein the method further comprises:

detecting an actual throughput of sending the TCP data packet in the network; and increasing a target throughput, when a ratio of the actual throughput to the target throughput is greater than a first threshold, and a difference between a fourth round-trip time of sending the TCP data packet in the network and a round-trip time detected when the network has light load is less than a second threshold; and reducing the target throughput, when the ratio of the actual throughput to the target throughput is less than a third threshold, and the difference between the fourth round-trip time and the round-trip time detected when the network has light load is greater than a fourth threshold.

10. The method according to claim 1, wherein the target throughput is transferred to a TCP protocol stack by using a target throughput parameter.

11. An apparatus for sending a Transmission Control Protocol (TCP) data packet, wherein the apparatus comprises:

a processor; and a non-transitory computer readable medium which contains computer-executable instructions;

the processor is configured to execute the computer-executable instructions to perform operations comprising:

obtaining a first round-trip time of sending a TCP data packet in a network;

determining a second round-trip time, wherein the second round-trip time is a round-trip time that exists when a congestion window that is determined according to a first algorithm and a congestion window that is determined according to a second algorithm have an equal size, wherein in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet;

using the congestion window determined according to the first algorithm as a first congestion window when the first round-trip time is longer than the second round-trip time;

using the congestion window determined according to the second algorithm as the first congestion window when the first round-trip time is shorter than or equal to the second round-trip time; and sending the TCP data packet by using the first congestion window.

12. The apparatus according to claim 11, wherein the increase step size of the congestion window determined in the second algorithm is positively correlated with the target throughput and is negatively correlated with the first round-trip time, and the increase step size of the congestion window determined in the first algorithm is negatively correlated with the first round-trip time.

13. The apparatus according to claim 11, wherein the target throughput is determined according to a bit rate, which is obtained by parsing a packet in the TCP data packet, of the service.

14. The apparatus according to claim 11, wherein the processor is further configured to execute the computer-executable instructions to perform operations comprising:

adjusting, to a second congestion window according to a third algorithm, a congestion window of transmitting the TCP data packet, when a packet loss occurs in a process of sending the TCP data packet, wherein the second congestion window is determined according to a third round-trip time that exists when the packet loss occurs on the TCP data packet, and a decrease step size of adjusting, to the second congestion window, the congestion window of transmitting the TCP data packet is negatively correlated with the third round-trip time; and sending the TCP data packet by using the second congestion window.

15. The apparatus according to claim 11, wherein the using the congestion window determined according to the first algorithm as the first congestion window comprises:

using a fast recovery value as a value of the increase step size of the congestion window, to obtain the first congestion window, when the first round-trip time is equal to the round-trip time that exists when the network has light load, wherein the fast recovery value has an order of magnitude same as that of a slow start;

using one maximum segment size (MSS) as a value of the increase step size of the congestion window, to obtain the first congestion window, when the first round-trip time is equal to a retransmission timeout (RTO) of the TCP in the network; and setting a value of the increase step size of the congestion window to be between one MSS and the fast recovery value and be negatively correlated with the first round-trip time, to obtain the first congestion window, when the first round-trip time changes within an interval between the round-trip time that exists when the network has light load and the RTO of the TCP in the network.

16. The apparatus according to claim 11, wherein the using the congestion window determined according to the second algorithm as the first congestion window comprises:

calculating a target window according to the target throughput and the first round-trip time, and using a difference between the target window and a current congestion window of the TCP in the network as the value of the increase step size of the congestion window, to determine the first congestion window.

17. The apparatus according to claim 11, wherein the processor is further configured to execute the computer-executable instructions to perform operations comprising:

detecting an actual throughput of sending the TCP data packet in the network;

increasing a target throughput, when a ratio of the actual throughput to the target throughput is greater than a first threshold, and a difference between a fourth round-trip time of sending the TCP data packet in the network and a round-trip time detected when the network has light load is less than a second threshold; and reducing the target throughput, when the ratio of the actual throughput to the target throughput is less than a third threshold, and the difference between the fourth round-trip time and the round-trip time detected when the network has light load is greater than a fourth threshold.

18. A system, wherein the system comprises a server and a terminal, wherein the server is in communication connection with the terminal by using a network; and wherein the server is configured to:

obtain a first round-trip time of sending a TCP data packet to the terminal in a network;

determine a second round-trip time, wherein the second round-trip time is a round-trip time that exists when a congestion window that is determined according to a first algorithm and a congestion window that is determined according to a second algorithm have an equal size, wherein in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet;

use the congestion window determined according to the first algorithm as a first congestion window when the first round-trip time is longer than the second round-trip time;

use the congestion window determined according to the second algorithm as the first congestion window when the first round-trip time is shorter than or equal to the second round-trip time; and send the TCP data packet by using the first congestion window to the terminal by using the network.

19. A system, wherein the system comprises a server, a first agent device, and a terminal, wherein the first agent device is in communication connection both with the server and the terminal;

wherein the server is configured to send a Transmission Control Protocol (TCP) data packet to the terminal by using the first agent device that acts as an agent; and wherein the first agent device is configured to:

obtain a first round-trip time of sending the TCP data packet to the terminal in a network;

determine a second round-trip time, wherein the second round-trip time is a round-trip time that exists when a congestion window that is determined according to a first algorithm and a congestion window that is determined according to a second algorithm have an equal size, wherein in the first algorithm an increase step size of the congestion window is determined according to the first round-trip time, in the second algorithm an increase step size of the congestion window is determined according to the first round-trip time and a target throughput, and the target throughput is a throughput expected to be obtained for a service corresponding to the TCP data packet;

use the congestion window determined according to the first algorithm as a first congestion window when the first round-trip time is longer than the second round-trip time;

use the congestion window determined according to the second algorithm as the first congestion window when the first round-trip time is shorter than or equal to the second round-trip time; and act as an agent of the server to send the TCP data packet received from the server by using the first congestion window to the terminal.

20. The system according to claim 19, wherein the terminal is configured to transfer the target throughput from a TCP protocol stack of the terminal to a TCP protocol stack of the first agent device by using a target throughput parameter.

* * * * *